United States Patent
Ptucha et al.

(10) Patent No.: US 7,847,979 B2
(45) Date of Patent: Dec. 7, 2010

(54) PRINTER HAVING DIFFERENTIAL FILTERING SMEAR CORRECTION

(75) Inventors: Raymond W. Ptucha, Honeoye Falls, NY (US); Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 819 days.

(21) Appl. No.: 11/482,272

(22) Filed: Jul. 7, 2006

(65) Prior Publication Data
US 2008/0007787 A1 Jan. 10, 2008

(51) Int. Cl.
H04N 1/407 (2006.01)

(52) U.S. Cl. .................. 358/3.26; 358/3.27; 347/20; 347/27; 347/32

(58) Field of Classification Search .................. None
See application file for complete search history.

(56) References Cited

U.S. PATENT DOCUMENTS

| | | | |
|---|---|---|---|
| 4,574,293 A | 3/1986 | Inui et al. | |
| 4,688,051 A | 8/1987 | Kawakami et al. | |
| 4,941,190 A | 7/1990 | Joyce | |
| 5,081,692 A | 1/1992 | Kwon et al. | |
| 5,343,283 A * | 8/1994 | van Dorsselaer et al. | 358/445 |
| 5,481,823 A | 1/1996 | Ghaderi | |
| 5,568,227 A * | 10/1996 | Wong | 399/16 |
| 5,661,521 A * | 8/1997 | Curtis et al. | 348/249 |
| 5,847,721 A * | 12/1998 | Ogata et al. | 347/9 |
| 5,862,266 A * | 1/1999 | Hunter | 382/266 |
| 6,091,861 A | 7/2000 | Keyes et al. | |
| 6,118,906 A | 9/2000 | Keyes | |
| 6,233,061 B1 * | 5/2001 | Huang et al. | 358/1.9 |
| 6,275,600 B1 * | 8/2001 | Banker et al. | 382/112 |
| 6,424,730 B1 | 7/2002 | Wang et al. | |
| 6,809,763 B1 * | 10/2004 | Yoshida | 348/248 |
| 6,819,347 B2 | 11/2004 | Saquib et al. | |
| 6,867,836 B2 | 3/2005 | Stalder | |
| 6,960,037 B2 * | 11/2005 | Kojima et al. | 400/582 |
| 7,104,627 B2 * | 9/2006 | Weast | 347/19 |
| 7,264,323 B2 * | 9/2007 | Tainer et al. | 347/11 |
| 7,289,146 B2 * | 10/2007 | Saigusa et al. | 348/248 |
| 7,365,880 B2 * | 4/2008 | Yamamoto et al. | 358/2.1 |
| 7,396,106 B2 * | 7/2008 | Fukuyasu | 347/41 |

(Continued)

OTHER PUBLICATIONS

William J. Pratt, "Digital Image Processing", 2nd edition, John Wiley & Sons, New York 1991, p. 503, ISBN 0-471-85766-1.

*Primary Examiner*—King Y Poon
*Assistant Examiner*—Dung D Tran
(74) *Attorney, Agent, or Firm*—Robert L. Walker; Raymond L. Owens

(57) ABSTRACT

In a method and printing apparatus, a receiver is moved in a travel direction relative to a print engine. The print engine has a predetermined profile of smear in the travel direction at a plurality of sites on the receiver. Each site corresponds to a respective one of the pixels. A digital image to be printed with the print engine is received and digitally filtered based on the profile to provide a filtered image. The filtering is localized, non-symmetrical, and at least partially compensatory of the smear. As the receiver is moved, the filtered image is printed on the receiver, the printing being modulated in accordance with the filtered image.

8 Claims, 17 Drawing Sheets

U.S. PATENT DOCUMENTS

| | | | |
|---|---|---|---|
| 7,483,587 B2 * | 1/2009 | Russell | 382/276 |
| 7,515,768 B2 * | 4/2009 | Nishi et al. | 382/275 |
| 7,545,420 B2 * | 6/2009 | Kondo | 348/248 |
| 7,586,520 B2 * | 9/2009 | Igarashi | 348/208.6 |
| 2001/0051208 A1 * | 12/2001 | Kwon et al. | 427/68 |
| 2003/0230966 A1 * | 12/2003 | Ozawa | 313/461 |
| 2004/0169896 A1 * | 9/2004 | Kondo | 358/482 |
| 2004/0246858 A1 * | 12/2004 | Saigusa et al. | 369/53.31 |
| 2005/0135697 A1 | 6/2005 | Fiete | |
| 2005/0231745 A1 * | 10/2005 | Kawai et al. | 358/1.12 |
| 2006/0001693 A1 * | 1/2006 | Im et al. | 347/19 |
| 2006/0232692 A1 * | 10/2006 | Takane | 348/248 |
| 2007/0086056 A1 * | 4/2007 | Hsieh | 358/3.01 |

* cited by examiner

PRINTER HAVING DIFFERENTIAL FILTERING SMEAR CORRECTION

FIELD OF THE INVENTION

This invention relates to printing and digital image processing methods and equipment and in particular to a printer and method providing differential filtering of images for smear correction.

BACKGROUND OF THE INVENTION

Thermal printers are often used to print photographic quality images for both in-store and in-home applications. Thermal dye printers transfer dye onto a page by heating dye on a donor material and having it migrate onto a receiver material. Resistive print heads are one of the most common methods of heating the dye on the donor. Resistive print heads utilize a stripe of tiny resistors, which are heated by selectively sending current through each. The stripe of resistors image an entire row of the image at a time. By varying the power through the resistor, the amount of dye is modulated to transfer from no dye transfer (Dmin) to maximum transfer (Dmax) in a continuous fashion. Because of this, thermal printers are continuous tone printers and can make excellent photographic quality prints.

Thermal dye sublimation printers transfer the dye by heating the dye sufficiently such that it changes to a vapor state and migrates across a small air gap onto the receiver. Thermal dye diffusion printers heat the dye, changing it to a liquid state, and then the dye transfers to the receiver when the receiver comes into contact with the donor.

The heating and cooling of the individual resistors is not instantaneous. The delay in heating a resistor causes a feature edge printing during an increase in heating, also referred to herein as a "rising edge", to appear blurry. The delay in cooling a resistor similarly causes a feature edge printed during a decrease in heating, also referred to herein as a "falling edge", to appear blurry.

The problem of smear is not limited to thermal printing. Smear also affects printing methods that move paper over a plate bearing fluid ink and other imaging techniques. In offset printing applications, master cylinders or plates wear over time. That wear, in conjunction with high speed printing causes smear down the printed page comparable to thermal smear.

It is highly desirable to make printers print faster. This tends to increase smear. As thermal printers print faster, the time it takes to print a single row of an image, known as "line time", decreases. As the line time decreases and the time to heat and cool a resistor stays relatively constant, the blurred rising and falling edges, which taking identical measures in the time domain, take up larger measures in distance, causing the blurred edges to stretch further down the printed page. The length of the blur is proportional to the decrease in line time. Blurrier edges have less low, middle, and high frequency content, and require increased sharpening to maintain sharpness in the resulting image. Unfortunately, the more an image is sharpened, the more any noise and artifacts in the image are also amplified.

Traditional thermal smear compensation techniques adjust the manner of heating and cooling the print elements of the thermal print head, thus compensating or partially compensating for smear as a part of the transferring of donor material. Innui et al, U.S. Pat. No. 4,574,293 discloses tracking heater pulses and adjusting pulse widths accordingly. Kawakami et al., U.S. Pat. No. 4,688,051 adjusts the pulse count. Saquib et al, U.S. Pat. No. 6,819,347 B2 discloses using a model of a thermal print head response to predict the temperature of each thermal print head element at the beginning of each print head cycle based on the ambient temperature of the print head, the thermal history of the print head, and the energy history. The amount of energy applied to each print element is then adjusted based on the predicted temperature at the beginning of the print head cycle. These approaches have the shortcoming that the compensation is the same throughout the image.

A wide variety of known algorithms, such as sharpening algorithms, can affect the higher spatial frequency image content. Joyce, U.S. Pat. No. 4,941,190 describes a method of modifying the gain of the center pixel of a sliding window as a function of the mean of the center pixel and its neighbors. Kwon et al., U.S. Pat. No. 5,081,692 discloses use of an unsharp masking method using center weighted local variance for image sharpening and noise suppression. The amplification factor of the difference between an original image and its blurred counterpart is changed using a pseudo center weighted variance. Ghaderi, U.S. Pat. No. 5,481,628 discloses using of a threshold value that is updated on a line-by-line basis and selecting between high-pass and low-pass filters dependant upon the local image, instead of using one filter type exclusively. Keyes et al., U.S. Pat. No. 6,091,861 discloses choosing the sharpening level based on the exposure, film type, grain estimate, and magnification of the original image. Keyes et al., U.S. Pat. No. 6,118,906, discloses using noise estimates of an original image to select sharpening levels. Wang et al., U.S. Pat. No. 6,424,730 discloses edge enhancement at specified high frequencies based on the human visual system. Shadow regions are enhanced more than highlight regions. Fiete, U.S. Published Patent Application 2005/0135697 A1 discloses a set of adjustable filters, in which each filter operates over a given spatial frequency region. These techniques can modify middle and high frequency content, but are not particularly effective in reducing smear. For example, sharpening algorithms are generally either circular or elliptically symmetric and sharpen uniformly across and down the page, and do not distinguish between rising and falling edges.

It would thus be desirable to provide printers and methods having digital filtering that do not have the above shortcomings.

SUMMARY OF THE INVENTION

The invention is defined by the claims. The invention, in broader aspects, provides a method for producing a printed image of a digital image having a plurality of pixels. In the method, a receiver is moved in a travel direction relative to a print engine. The print engine has a predetermined profile of smear in the travel direction at a plurality of sites on the receiver. Each site corresponds to a respective one of the pixels. A digital image to be printed with the print engine is received and digitally filtered based on the profile to provide a filtered image. The filtering is localized, non-symmetrical, and at least partially compensatory of the smear. As the receiver is moved, the filtered image is printed on the receiver, the printing being modulated in accordance with the filtered image.

It is an advantageous effect of the invention that an improved printers and methods having digital filtering that reduces smear.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
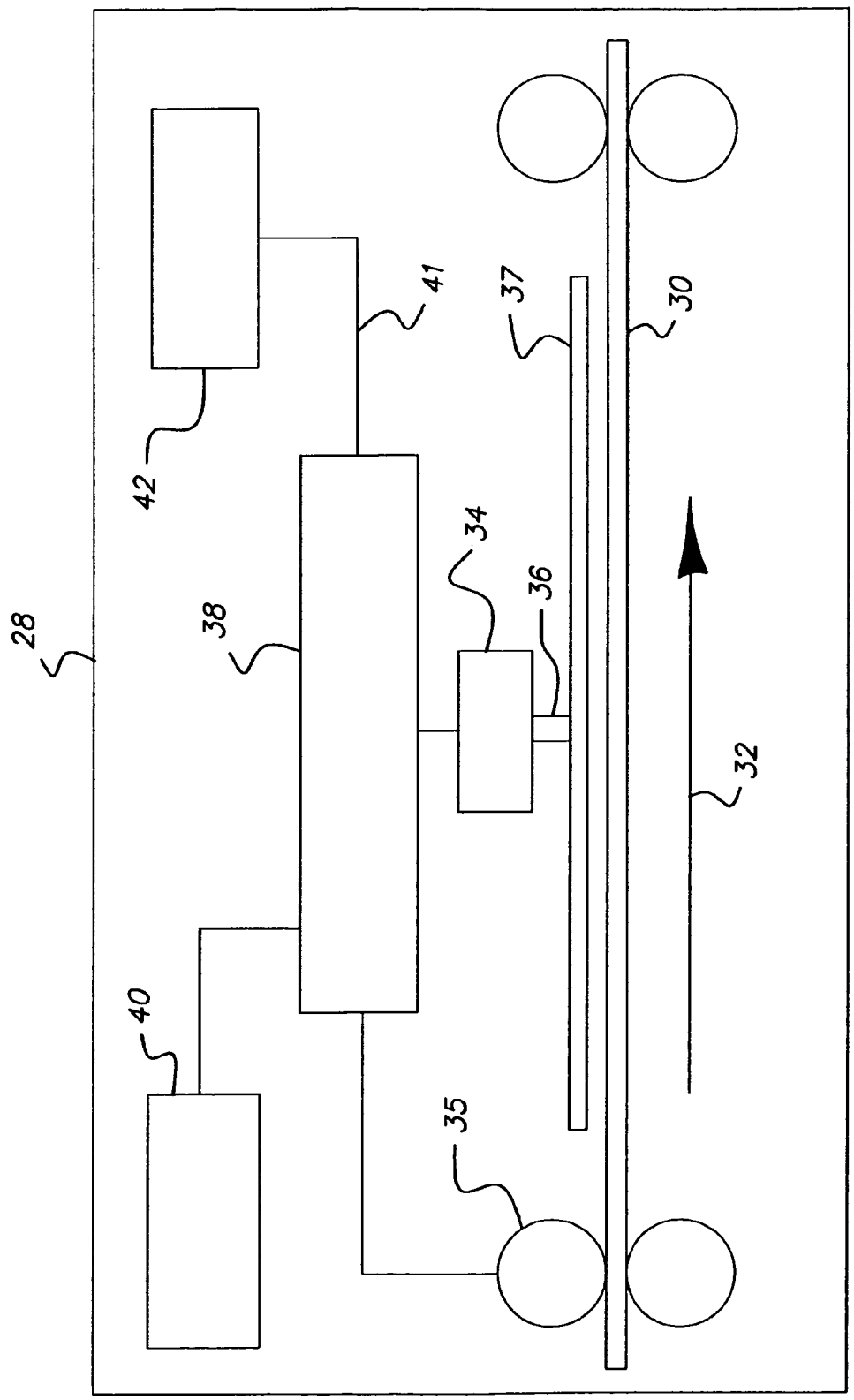
FIG. 1 a diagrammatical view of an embodiment of the printing apparatus of the invention.

In the methods and apparatus herein, smear is reduced by digital filtering that is localized and non-symmetrical. The term "smear" is used herein to refer to erroneous increases or decreases in density or equivalent image unit values of a visible image. Smear can be due to a physical transfer of an image component, such as transfer of ink or the like from an intended image unit of an image to a neighboring image unit as a result of contact during relative movement of an image carrier and an image generator. For example, an offset printing press transfers ink from a plate to a blanket to a receiver. The transfer of a spot of ink may be blurred in the motion direction of the plate to the blanket and of the blanket to the receiver. The blurring of the lead edge of the ink spot on the receiver may be different than the blurring of the trail edge. The method can compensate the image written onto the plate by a platesetter to correct for the smear.

Smear can also be due to an asymmetric response of an image generator, in effect, the failure of an image generator to fully recover after generating earlier pixels or image units of the image. In this case, travel of an image carrier relative to the image generator also occurs, but it is a property of the image generator that is smeared, rather than a physical component of the image itself. For example, in many thermal printers, there are differences in heating and cooling of elements of a thermal print head due to respective resistors being driven on, and cooled passively. Those different rates cause temperature variations that can be referred to as thermal smear. A resulting visible image exhibits asymmetrical smear comparable to that produced by physically smearing ink.

In a cathode ray tube ("CRT"), an electron beam is driven into a phosphor image unit causing it to fluoresce and give off light. Then, the electron beam is taken away or moved and the fluorescence relatively slowly degrades over time. This causes the CRT to have a fast on or rising edge and a slow off or falling edge. A left to right, top to bottom raster control sweeps the electron beam, resulting in an asymmetric smear in the vertical direction.

The terms "image generator" and "image carrier" are used herein to refer to equipment that produces a visible image and a structure that receives that visible image, respectively. The visible image can be printed or displayed. With printing, the image generator is all or part of a print engine or the like and the image carrier is a receiver, such as a piece of paper, that ultimately bears a printed image or a transfer member that acts as an intermediate in transferring the visible image to a receiver. Examples of transfer members include release paper used for iron-on transfers and offset press blankets. The image carrier of a displayed visible image is a screen that outputs the light image and the image generator is a portion of the display that generates the image. For example, with a cathode ray tube, the electron gun and raster system are the image generator and the image carrier is a screen of phosphor dots or bars.

Smear presents as unidirectional blurring that can be measured as directional and signal dependent modulation transfer function (MTF) variability, where MTF is used in its normal sense to refer to a metric used to measure an imaging device or imaging media's ability to produce image detail as a function of spatial frequency. Specific techniques for measuring MTF are well known to those of skill in the art. Rising and falling edges with smear appear blurry to humans or a machine reading the output.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The term "filter" is used herein to refer to both individual filters and families of related filters. The appropriate usage will be understood from context, with the proviso that, except where limited by circumstances, the filter used is a "family".

It should be noted that the present invention can be implemented in a combination of software and/or hardware and is not limited to devices, which are physically connected and/or located within the same physical location. One or more of the devices can be located remotely and can be connected via a network. One or more of the devices can be connected wirelessly, such as by a radio-frequency link, either directly or via a network. In the following description, one or more embodiments of the present invention are described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware and/or software for producing and otherwise processing the image signals involved therewith, not specifically shown or described herein may be selected from such systems, algorithms, components, and elements known in the art. Given the description as set forth in the following specification, all software implementation thereof is conventional and within the ordinary skill in such arts.

The present invention may be employed in a variety of user contexts and environments. Exemplary contexts and environments include, without limitation, home printing, printing over a network such as the Internet via the World Wide Web, kiosks, printing using a mobile device. In each case, the invention may stand alone or may be a component of a larger system solution. Furthermore, human interfaces, e.g., input, digital processing, display to a user (if needed), input of user requests or processing instructions (if needed), output, can each be on the same or different devices and physical locations, and communication between the devices and locations can be via public or private network connections, or media based communication. Where consistent with the foregoing disclosure of the present invention, the method of the invention can be fully automatic, may have user input (be fully or partially manual), may have user or operator review to accept/reject the result, or may be assisted by metadata (metadata that may be user supplied, supplied by a measuring device (e.g. in a camera), or determined by an algorithm). Moreover, the algorithm(s) may interface with a variety of workflow user interface schemes.

A digital image includes one or more digital image channels or color components. Each digital image channel is a two-dimensional array of pixels. With captured images, each pixel value relates to the amount of light received by the imaging capture device corresponding to the physical region of the pixel. For color imaging applications, a digital image will often consist of red, green, and blue digital image channels. Video segments can be considered a sequence of digital images. Those skilled in the art will recognize that the present invention can be applied to one or more or all of the digital image channels of an image. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described hereinbelow as replacing original pixel values with processed pixel values is functionally equivalent to describing the same processing steps as generating a new digital image with the processed pixel values while retaining the original pixel values. The printing described herein can have the capability of generating color images or can be limited to monotone images such as black and white, grayscale or sepia toned images. The printing can include any number of printing channels or be limited to use of one or more specialized inks, such as luminescent inks, magnetic inks, conductive inks, and the like.

The term "printing apparatus" is used herein to refer to one or more pieces of equipment that together provide a printing function. Examples of printing apparatus include a thermal printer operable in accordance with the method without a separate computer, a computer system inclusive of a thermal printer that lack a microprocessor, a consumer thermal printing photofinishing kiosk, and an offset lithographic or thermographic press, a computer-to-plate platesetter, and a separate computer. Print engines that print with smear will benefit from the described invention. Smear correction of a thermal print head can be provided as disclosed herein in combination with the traditional thermal smear compensation techniques of U.S. Pat. No. 4,574,293, U.S. Pat. No. 4,688,051, and U.S. Pat. No. 6,819,347, which adjust heating and cooling of the elements of the thermal print head.

In some embodiments, the method is not limited to printing. The smear compensation can be applied, for example, to smear in a captured optical image produced by light emission from a rapid-emission phosphor screen, such as a cathode ray tube, or storage phosphor screen, such as a computed radiography element.

Figure 3:
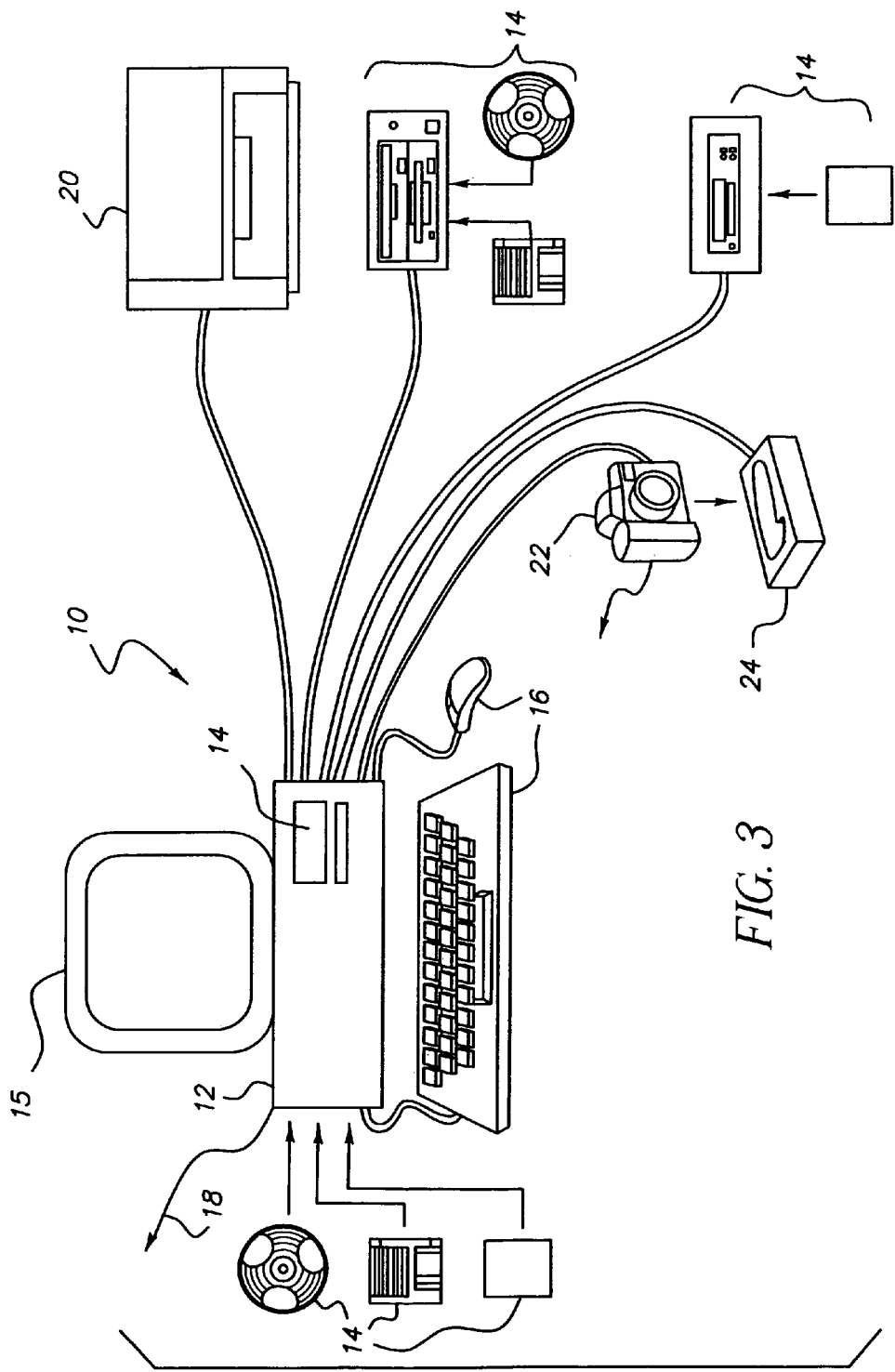
FIG. 3 is a diagrammatical view of another embodiment of the printing apparatus of the invention.

FIG. 3 illustrates a printing apparatus 10 in the form of a computer system. The computer system shown is an example and is not limiting. The computer system can be in the form of separate components or one or more of those components can be part of another device. Such components and systems can be found in digital cameras, home computers, kiosks, retail and wholesale photofinishing, and other systems for the processing of digital images. Referring to FIG. 3, the computer system 10 includes a computing unit 12 having a microprocessor and associated circuits (not separately illustrated) for receiving and processing software programs and for performing other processing functions. A display 15 is electrically connected to the computing unit 12 for displaying user-related information associated with the software, e.g., by means of a graphical user interface. One or more input devices 16, such as a keyboard and mouse are also connected to the computing unit 12 to allow a user to input information to the software. The computer system 10 includes memory 14 in the form of one or more drives or other memory units. Software programs and digital images can be stored using this memory 14 and can be transferred using removable memory 14. The software programs can optionally include image processing unrelated to the invention. For example, the software can be used to process digital images to make adjustments for overall brightness, tone scale, and image structure of digital images. The computing unit 12 can have a network connection 18, such as a telephone line, to an external network, such as a local area network or the Internet. A printer 20 is connected to the computing unit 12. Digital images can be input to the system via removable memory 14, the network connection 18, or directly from a capture device 22, such as a digital camera via a camera docking port 24 connected to the computing unit 12 or via a camera or scanner (not shown) directly connected via a cable or wireless connection to the computing unit.

Figure 17:
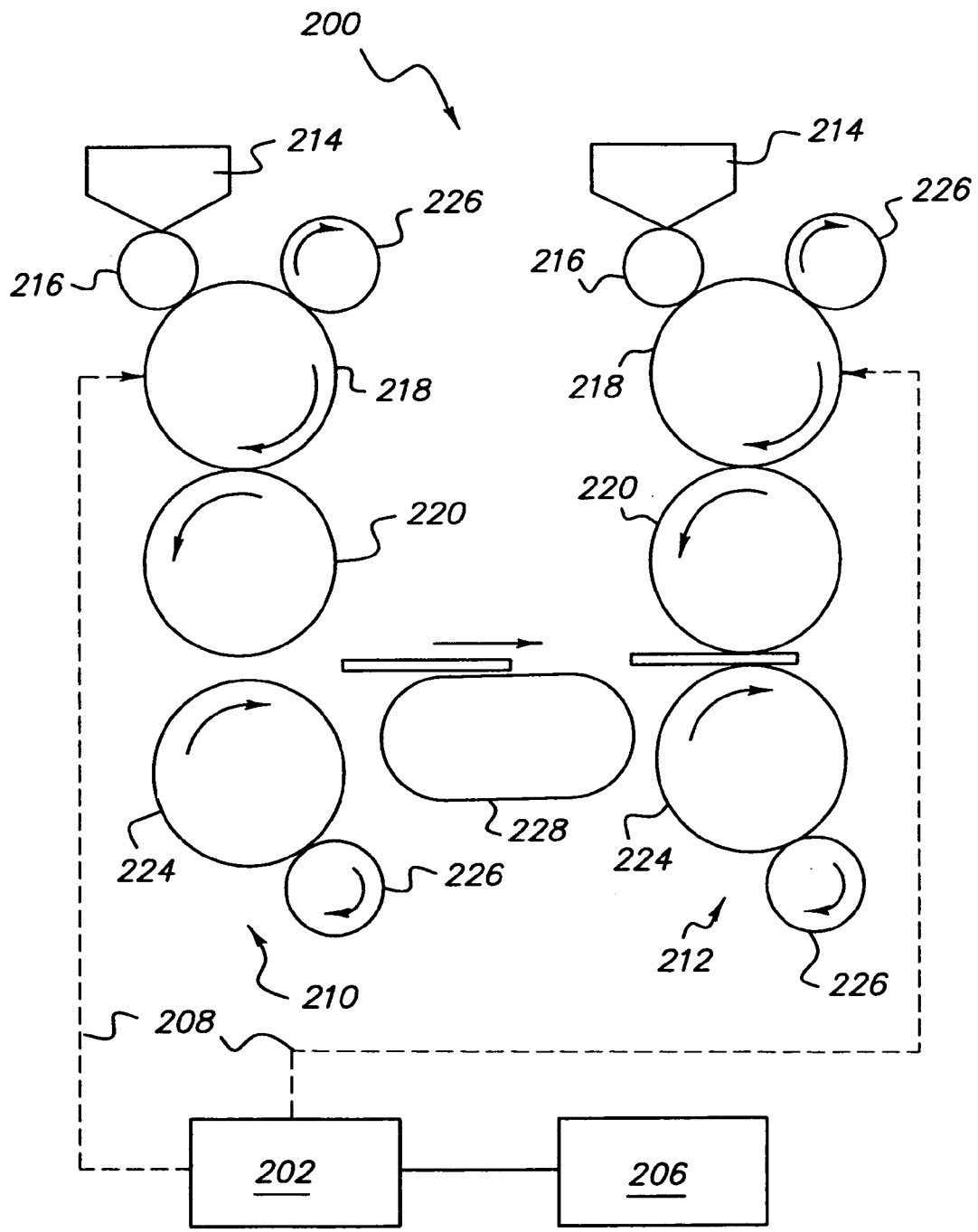
FIG. 17 is a diagrammatical view of another embodiment of the printing apparatus of the invention.

Referring to FIG. 17, an offset printing apparatus 200 includes a separate computer-to-plate plate setter 202, a press 204, and a computer 206 operatively connected to the plate setter 202. Plates (not separately illustrated) produced using the plate setter 202 are installed (indicated by dashed lines 208) on the press 204. Two stations 210,212 are shown. In each station 210,212, ink is delivered from a fountain 214 to an inking roller 216 and then to the respective plate (shown as a plate roller 218). The ink image formed is transferred from the plate to a blanket (shown as a blanket roller 220) and then to a receiver 222 by means of an impression cylinder 224. An advance (illustrated as four driven rollers 226 and a driven belt 228) moves the receiver 222 and the other rollers 216, 218,224. Respective arrows indicate directions of rotation and receiver movement.

For convenience, the following discussion is generally directed to a printing apparatus in the form of a printer that is operable without additional components. Like considerations apply to other apparatus.

Figure 2:
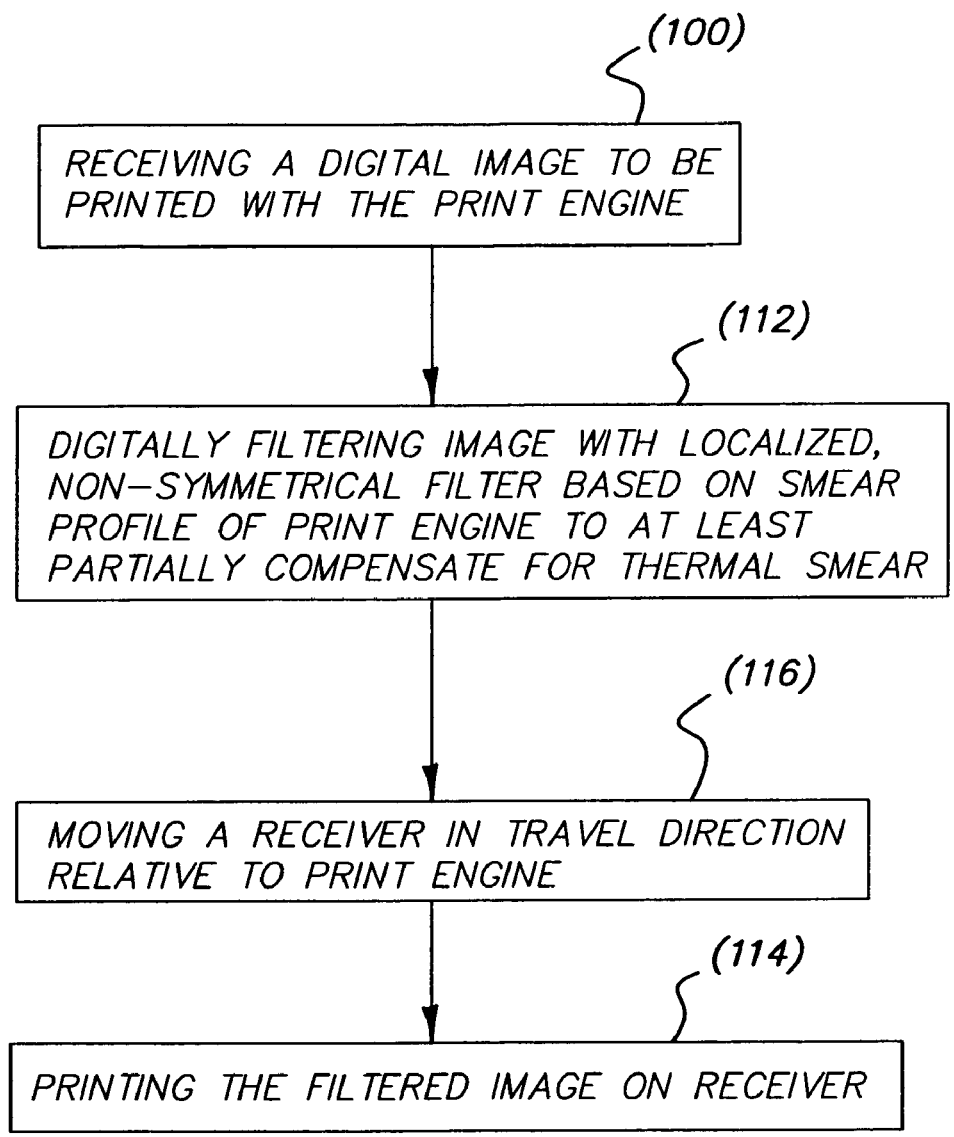
FIG. 2 is a flow chart of an embodiment of the method of the invention.

Referring to FIGS. 1-2, in particular embodiments of the method, in a printer 28 a receiver 30 is moved in a travel direction (indicated by arrow 32) relative to a print engine 34 by a receiver advance 35. A digital image is received, digitally filtered, and printed on the receiver 30 by the print engine 34.

The print engine 34 has a predetermined profile of smear in the travel direction. The filtering is based on the profile and at least partially compensatory of smear. The printer has an image forming unit having a plurality of individual image transfer elements 36 capable of printing on a receiver. It is currently preferred that the print engine is a thermal print engine that thermally transfers donor material to form the image on the receiver. In that case, the smear is due to lag in heating and cooling of individual print elements of the print engine.

The receiver is any of a wide variety of printable media, such as a sheet of paper, layered composite, or non-cellulose media. The elements are subject to smear in a travel direction, in which an advance moves a receiver past the image transfer elements. This movement is relative. The receiver can move, the image transfer elements can move, or both. In particular embodiments, the image forming unit is a print head and the transfer elements are individually actuable print elements. In a press system, the transfer elements are ink holding elements of a plate.

In the embodiment of FIG. 1, the image forming unit is a thermal print head and the transfer elements are individually actuable print elements that are heated to transfer heat to adjacent portions of transfer media 37. Each of the print elements are subject to lag in thermal heating and cooling resulting in smear during printing as the receiver is moved by the advance (illustrated as opposed pairs of pinch rollers). The smear can be fully uncorrected prior to the digital filtering described herein or the smear corrected by the digital filter can be a residual remaining after partial correction has been provided by modifying the heating and cooling of the print elements. An example of a suitable technique for this purpose is disclosed in U.S. Pat. No. 6,819,347.

A control unit 38 of the printer 28 operates the print engine 34 and the receiver advance 35. The control unit 38, after receiving the digital image to be printed, digitally filters the input digital image to provide a filtered image and actuates the print engine 34 to print the filtered image on the receiver 30. The filtering is at least partially compensatory of the smear and is based on a predetermined profile of the smear that is stored in memory 40 and accessed by the control unit 38.

The control unit 38 can include, but is not limited to, a programmable digital computer, a programmable microprocessor, a programmable logic processor, a series of electronic circuits, a series of electronic circuits reduced to the form of an integrated circuit, or a series of discrete electrical elements. The control unit is operatively connected to memory 40 and other components by communication paths 41. The control unit can optionally include one or more sensors for monitoring environmental conditions, receiver position, and the like, which would be capable of affecting the operation of the printing apparatus.

Memory 40 can include conventional memory devices including solid state, magnetic, optical or other data storage devices. Memory can be fixed within the printer or can be removable. The memory can include a hard drive, a disk drive for a removable disk such as an optical, magnetic or other disk memory (not shown) and a memory card slot that holds a removable memory such as a removable memory card and has a removable memory card interface for communicating with removable memory. Data including but not limited to control programs, digital images and metadata can also be stored in a remote memory system (not shown) that is external to the printer, such as a personal computer, computer network or other digital memory system such as a so called "WI-FI" enabled memory card.

The printer 28 can include a user interface 42 that can provide inputs to the control unit 38 to change the operation of the printer 28. The user interface 42 can include one or more displays or other output devices to communicate information to the user. For example, the user interface can be used to perform operations on images saved in memory of the printer 28, such as, selecting among multiple images and modify image processing and printing of a selected image or images. Software needed to perform selected operations can be stored in memory in the printer 28 or can be downloaded as necessary using a communications unit (not separately illustrated) of the control unit 38. Operations can also be performed in part in the printer and in part on an external device or network. The user interface 42 can also control additional functions provided by the printer or other devices or networks used with the printer. The communications unit provides for communication between the printer and one or more devices and/or networks. Communications can be wired or wireless or can combine wired and wireless capabilities in any combination. For example, the printer can be a kiosk and the communications unit can communicate status of supplies to a remote computer via a network.

The smear profile indicates predicted smear at a plurality of sites on the receiver. Each site corresponds to a respective one of the pixels of the image to be printed on the receiver. The profile can predict smear based on a single line time or a small number of line times, but it is preferred that the profile match possible smear under all expected printing conditions. For example, in thermal printers, thermal lag varies as a receiver is printed and it is preferred that the profile predict smear for any multiple of line times. A smear profile can be determined heuristically. For example, smear on printed output can be uniformly sampled using a test target and average smear under specified conditions can be determined. For convenience, profiles are discussed herein as being predetermined and individual for each purpose. Separate profiles need not be physically or logically distinct as long as individual data is available as needed. Profiles can be provided in any manner convenient, such as look-up tables or programmed algorithms providing like data. It is particularly convenient to provide a profile in the form of a predetermined filter or family of predetermined filters.

The digital filtering provides sharpening or edge restoration. The term "sharpening" is used broadly to refer to a filter that provides a boost in modulation transfer function of the system producing the printed image. Sharpening thus provides a relative increase in one or both of contrast and size of some or all of the edges in a digital image. The term "sharpening" is, thus, inclusive of non-uniform smoothing, in which a region having less smoothing than other regions is relatively "sharpened". The extent of sharpening can depend upon the intensity value of a respective pixel or neighborhood of pixels. In this case, it is preferred that the sharpening filter operates on each of the color records separately so that the sharpening can properly reflect the different color records. The extent of sharpening applied can be an automatic function of the one or more image parameters, or of additional information, such as metadata, or can be provided by a user-adjustable parameter input using the user interface.

The smear compensation filter used can sharpen edges of all frequencies and modulations. Because smear manifests differently at different printer speeds, it is often more convenient to talk in terms of a normalized frequency rather than absolute frequency. The term "normalized frequency" used herein refers to the frequency multiplied by the line time. In the units used herein, the frequency is in cycles/sample and the line time is in milliseconds, resulting in a unit for normalized frequency in cycles×milliseconds/sample. A printer with a 1 msec line time, thus, has a normalized frequency equal in magnitude to the frequency itself. A faster line time, with everything else remaining equal, results in a lower normalized frequency and a slow line time, with everything else remaining equal, resulting in a higher normalized frequency. Using this normalized frequency metric, a high frequency is anything greater than 0.2. A low frequency is anything less than 0.05. All normalized frequencies in the range between 0.05 and 0.2 are considered mid-range or middle frequencies.

The smear compensation digital filter provides filtering that is localized, non-symmetrical, and non-linear. Localized digital filtering is digital filtering that adjusts the boost as a function of the working pixel and its neighbors in a linear fashion. Non-symmetrical filtering is filtering in which the extent of filtering differs in different directions relative to the travel direction. The maximal increase in sharpness is in the travel direction. The non-symmetry of the filter is proportional to the magnitude of the smear in the travel direction (which is also the smear direction). Non-linear filtering is filtering in which falling edges are boosted differently than rising edges or dark pixels are boosted differently from light or mid-tone pixels. Other examples of non-linear filtering include detection of image content such as flesh, foliage, sky, or other subject matter; local statistical metrics, such as local noise variance parameters.

The smear compensation filter can be constructed so as sharpen edges that extend in multiple directions. This typically can be done by sharpening edges in a manner that equally considers edges that extend horizontally, vertically, and diagonally. In a preferred embodiment, the smear compensation filter does not consider edges equally. A different extent of sharpening is provided in diagonal directions than in horizontal and vertical directions. The resulting slight image degradation has been determined to be acceptable. The benefit is an extensive reduction in computing demands. In particular embodiments, the smear compensation filter can be implemented as a series of one-dimensional lookup tables (1D LUTs). The LUTs can utilize additions rather than multiples and divides. It will be understood that a LUT can be directly replaced or approximated by an appropriate algorithm. The smear compensation filter can alternatively be implemented as a series of bit shifts and additions.

In particular embodiments of the invention, the smear compensation filter is a spatial linear filter (also referred to as a convolution filter) and is implemented as a sliding window or kernel that is applied to the pixels of the digital image. The size of the sliding window is matched to the extent of smear of each of the pixels of the digital image. The extent of smear can be determined from the profile of smear of the printer.

The smear compensation filter can be recursive and can be a finite impulse response filter (FIR) or infinite impulse response filter (IIR). IIR filters can filter lower frequencies with smaller kernels resulting in a reduced computational burden at those frequencies.

In particular embodiments, the smear compensation filter is adaptive, that is, the filter changes with changes in the content of the image, either with an individual pixel, or within a local neighborhood, or globally. The filter can be changed by scaling coefficients of the kernel or by modifying the shape or size of the kernel. The filter boost can change as a function of the intensity values of the center pixel, neighborhood pixels, or entire image. Alternatively, the filter can be changed in the same ways, but based on results of an edge detection filter or a first derivative filter such as Prewitt, Sobel, or pixel difference filters, as shown in William J. Pratt, *Digital Image Processing,* 2nd Edition, John Wiley & Sons, New York, 1991, page 503, ISBN 0-471-85766-1. The changes can be modulated in response to the presence of edges or one or both of edge magnitude and edge direction. Rising edges, falling edges, non-edge areas and the like can also be factors used to modulate the smear compensation filter. For example, an advantage of adapting the filter to rising or falling edges is that the filtering can compensate for differences at rising and falling edges, such as those due to resistor heating and cooling in a thermal resistive head.

In a particular embodiment, the method includes both a smear compensation filter and another sharpening filter. The second sharpening filter is elliptically symmetric, with different boost values in the horizontal and vertical directions. The two filters can be applied separately or can be combined into a single filter. An appropriate symmetrical sharpening filter can be determined by a characterization of the printer image produced following smear compensation filtering. It has been determined, that the symmetrical filter can also be limited to a consideration of horizontal and vertical edges to reduce computational demands. The symmetrical filtering can also be performed using pairs of one-dimensional unsharp masks, as disclosed in U.S. Pat. No. 5,081,692 to Parulski et al. This approach has reduced computational demands, since the masks used are one-dimensional.

Figure 5:
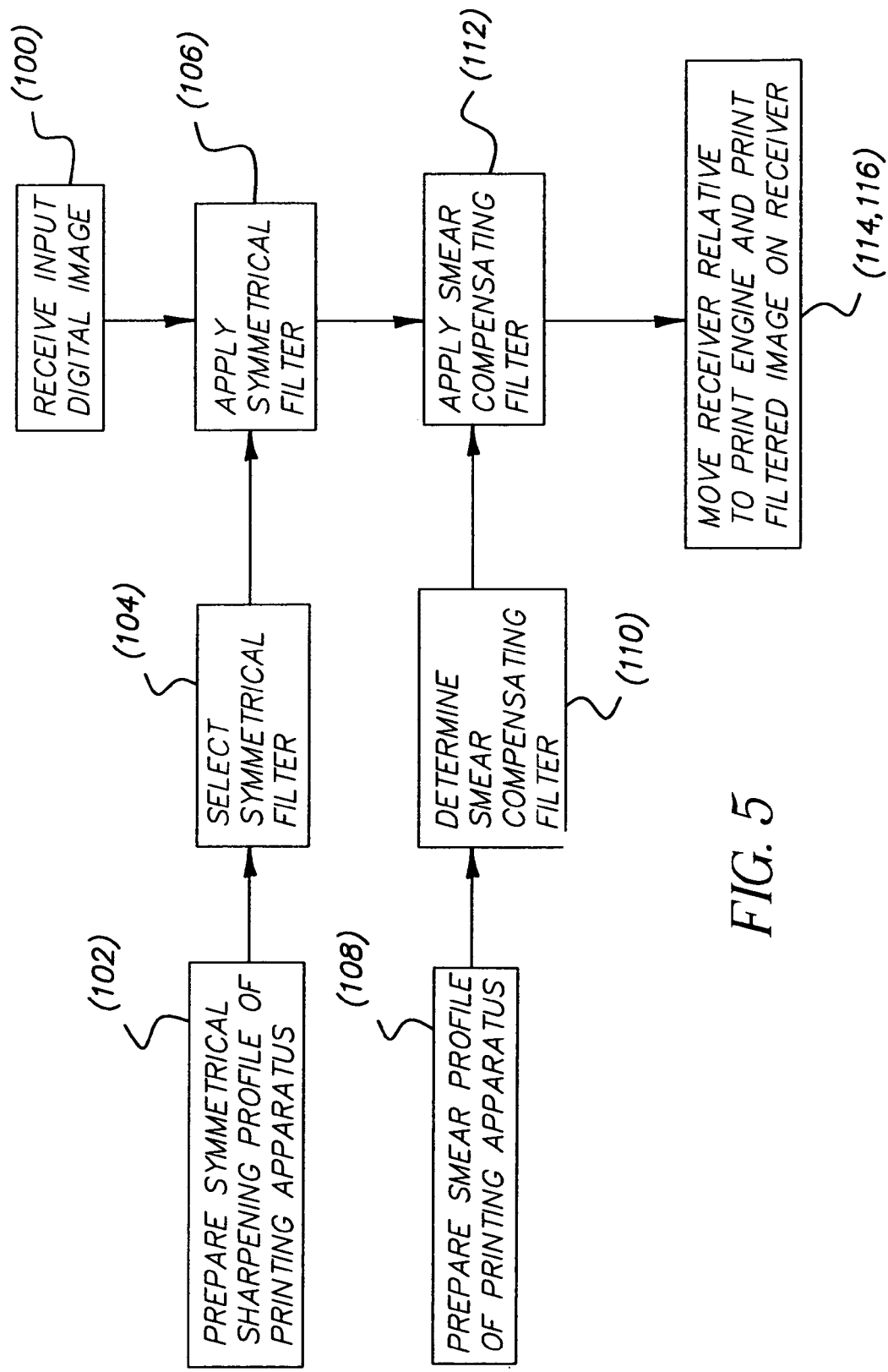
FIG. 5 a diagrammatical view of a modification of the method of FIG. 2.

In FIG. 5, a particular embodiment of the method is shown, in which the method includes the features of FIG. 2 and, in addition, the printing apparatus is characterized to provide a smear profile and a symmetrical sharpening profile and symmetrical filtering is also provided. This embodiment is presented in detail to provide a comprehensive discussion of the method and apparatus. It is expected that in many uses, predetermined profiles for the type of printing apparatus or individual printing apparatus would be used rather than performing a characterization. The characterization is also discussed as being performed in two different steps at two different times. This is for convenience in discussion. Actual characterization can be performed in any manner and at particular times as convenient for the user.

Referring now to FIGS. 2 and 5, an input digital image is received (100). A first printing apparatus characterization is performed (102) to prepare a symmetrical sharpening profile, which is used in selecting (104) a symmetrical sharpening filter to provide horizontal and vertical sharpening boost filtering. The symmetrical horizontal and vertical boost filter is applied (106) to the input digital image, generating an intermediate digital image. A printing apparatus characterization is performed (108) to prepare a smear profile, which is used in determining (110) a smear compensating filter, which provides down the page sharpness boost filtering. The smear compensating filter is applied (112) to the intermediate image, generating a filtered image, which is then printed (114) on the characterized printing apparatus as the receiver is moved (116). The smear compensating filter filters all frequencies with emphasis on middle to high normalized frequencies.

The symmetrical filter characterization can be performed in a manner well known to those of skill in the art, by printing and measuring characteristics of a test target. An example of a suitable test target having MTF targets and horizontal and vertical bar targets is described in U.S. Pat. No. 5,081,692. Targets for sine waves, edges, slanted edges and square waves can be provided. Since the symmetrical filter is limited to the horizontal and vertical directions, gathering of frequency information can be likewise limited. A filter aim can be selected by measuring the device MTF, then creating a filter aim equal to 1/MTF. A family of filters bracketing about this aim can be created and made available to the user, who can make a final selection. The symmetrical filter can be applied iteratively and/or combinations of filters can be used.

After the printing apparatus is characterized, a symmetrical horizontal and vertical sharpening filter is selected and applied. This selection is based on criteria known to those of skill in the art. Optimal performance is judged heuristically, by printing and measuring test targets and by subjectively by looking at prints of typical images. Different types of sharpening can be considered, such as direct sharpening, separable sharpening, unsharp masking, frequency domain boosting, and others known to those skilled in the art. In particular embodiments, the symmetrical filter can be implemented as a series of 1D LUTs. The particular level appropriate for a particular input digital image can also be determined heuristically.

The second characterization determines smear, which can also be described as sharpness down the page in the travel direction. Smear is exhibited as directional and has signal dependent Modulation Transfer Function (MTF) variability. The results of the second characterization are used in determining a smear compensating filter that is then applied to the intermediate digital image generating a final digital image.

It is preferred in the second characterization to use a target, which has a plurality of sets of different patches, each set corresponding colorimetrically to a respective one of the color records printable by the printing apparatus. Each of the sets has features exhibiting brightness transitions at a plurality of different spatial frequencies. Those frequencies are preferably spaced throughout the spatial frequency range expected in image content of input digital images, preferably in even steps. The goal of the sets of features is to bracket important image content, such that it is apparent whether a particular level of sharpness on the printed image is causing over-sharpening, under-sharpening, or no artifacts. To reduce complexity, this target can also be used for the symmetrical filter characterization.

Figure 15:
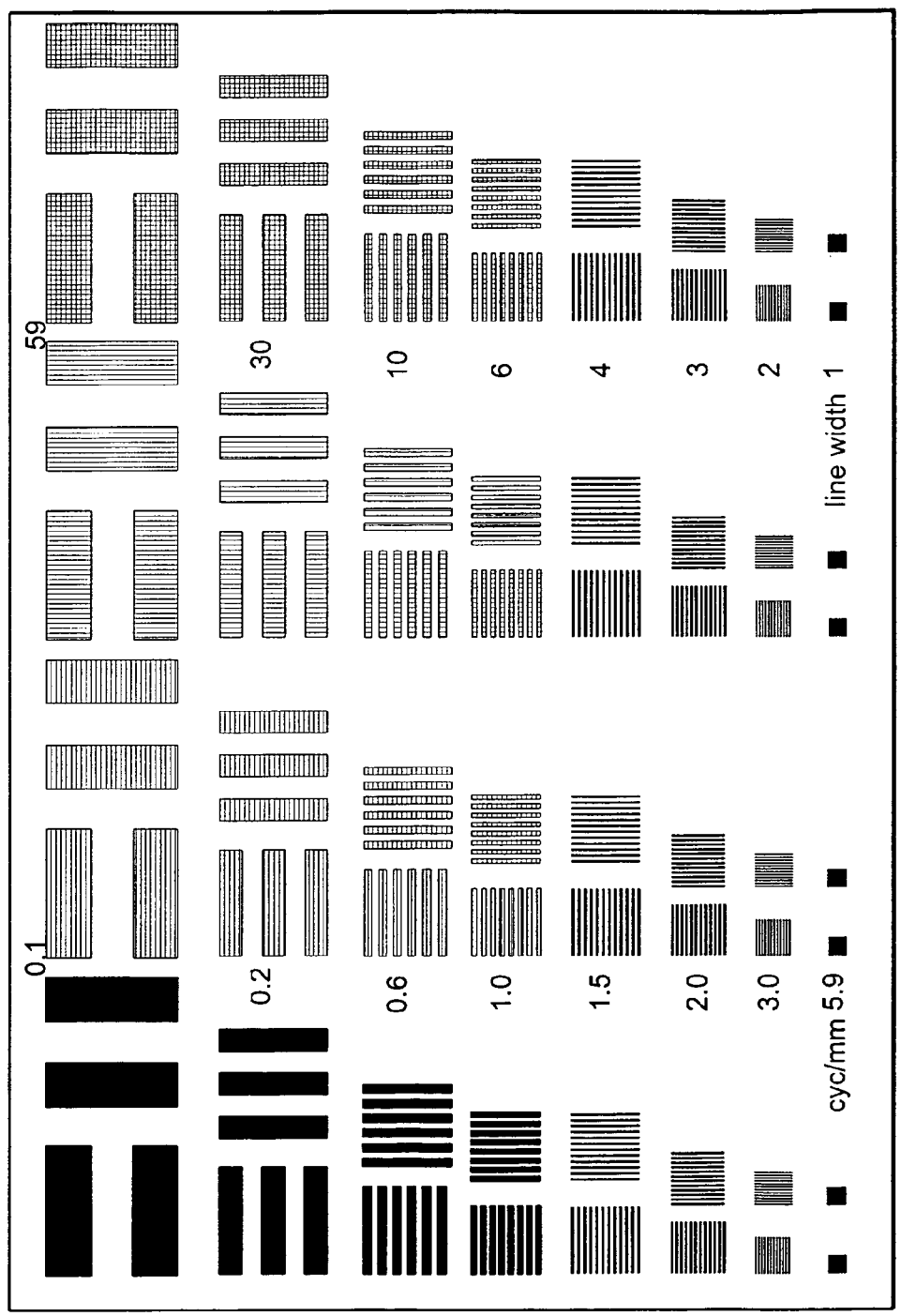
FIG. 15 is a semi-diagrammatical view of the test target of the method of FIG. 5.

An example of such a test target is shown in FIG. 15. The target has four sets of patches corresponding to cyan, magenta, yellow, and black image records. The numbers of sets can be varied to match the number of image records. In each set, the target has patches covering eight regions of the frequency spectrum. Using this target, it is possible to create unique sharpening filters for the cyan, magenta, yellow, and black records. With this target, the goal of the filtering provided by the smear compensating filter is to maximally boost the low to mid frequencies going down the page until there is just a hint of over-sharpness. A little bit of over-sharpness is good in the 0.1 to 1.5 cycles/mm frequencies, but at first glance it should not be noticeable. The higher frequencies are a little different. For optimal looking prints, there should be noticeable over-sharpening in the 2.0, 3.0, and 5.9 cycles/mm patches.

Figure 4:
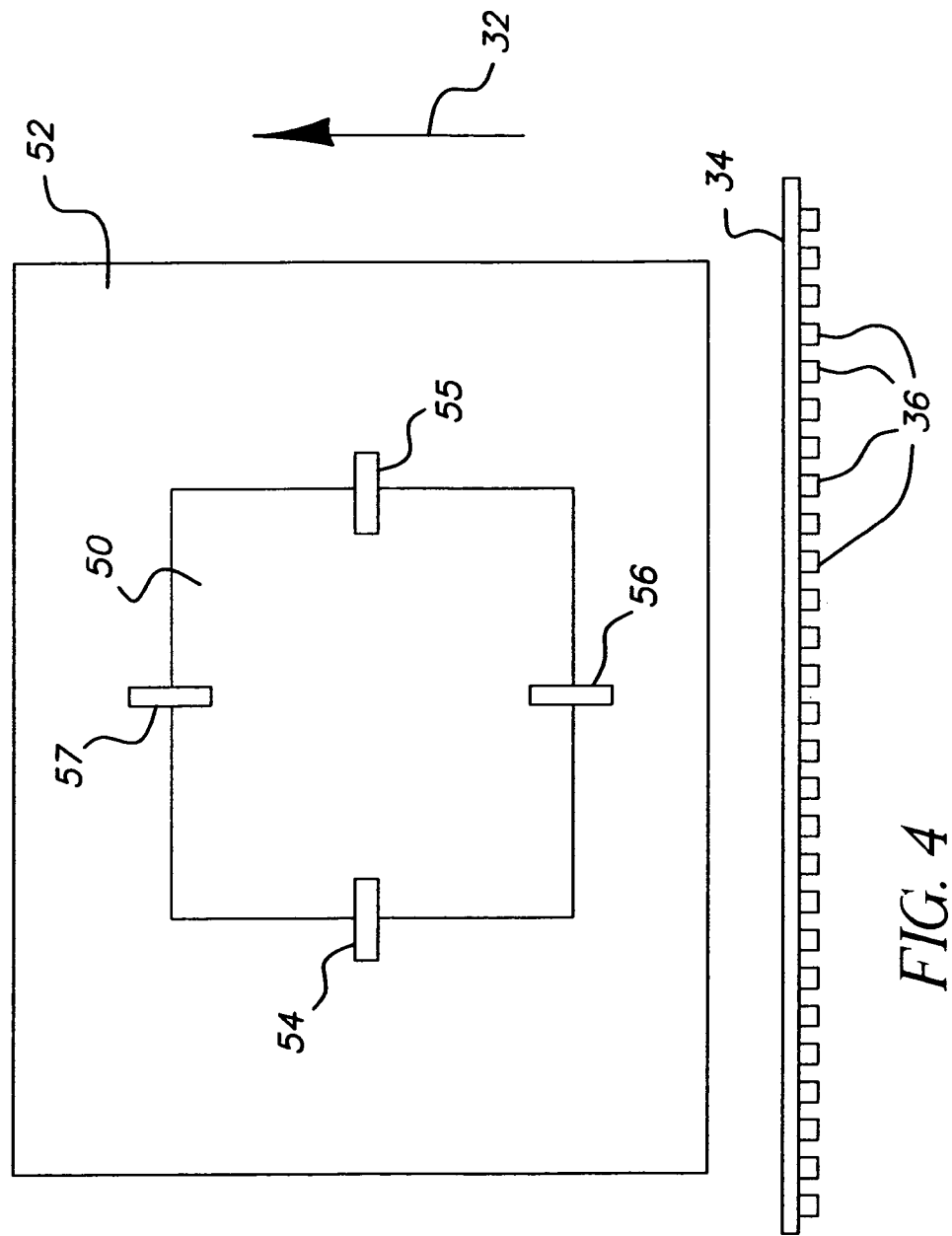
FIG. 4 is a diagram showing the relationships of edges in a printed image to the print head and travel direction of the apparatus of FIG. 1.

The following discussion relates filtering to an example of smear for a particular printing apparatus. Referring to FIG. 4, a dark (2.4 Status A density) square (reference numeral 50 in FIG. 4) (approximately 150×150 pixels) was printed on a grey (0.8 Status A density) background (reference numeral 52 in FIG. 4) on a 300 dpi thermal printer with a line time of 1.1 msec/line. This printed black square was then scanned with the print tilted at 7 degrees on a flatbed reflection scanner at 600 dpi. The resulting scans were then read into commercially available mathematical analysis software marketed as Matlab™ by The Math Works, Inc. of Natick, Mass. The slanted edge analysis tool sfrmat 2.0 (available as an Internet download, on the World Wide Web, at www.i3a.org/downloads_iso_tools.html and referenced to ISO (International Standards Organization) 12233—Resolution) was used to compute the MTF on each of the 4 edges of the square.

Figure 6:
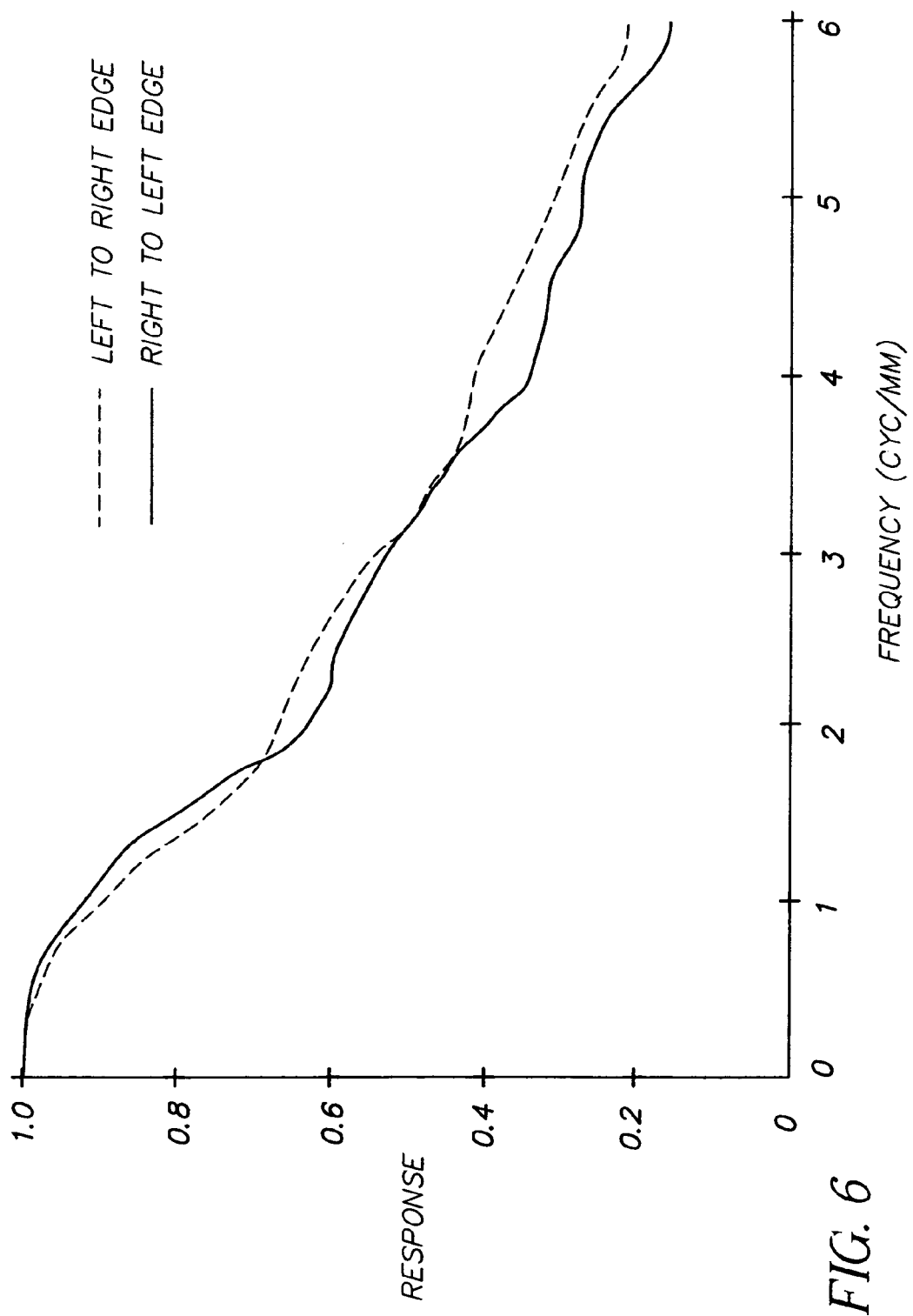
FIG. 6 is a plot of the modulation transfer function (MTF) for the along the head direction of the printed image of FIG. 4.

The resulting MTF plots for the fast, or along the head direction (transverse to the travel direction) are shown in FIG. 6. The left edge of the square (indicated by rectangle 54 in FIG. 4) going from gray to black is shown by a solid line in FIG. 6. The right edge (indicated by rectangle 55 in FIG. 4) going from black to gray is shown by a dashed line in FIG. 6. The two MTF curves are quite close to one another and any differences are assumed to be measurement error.

Figure 7:
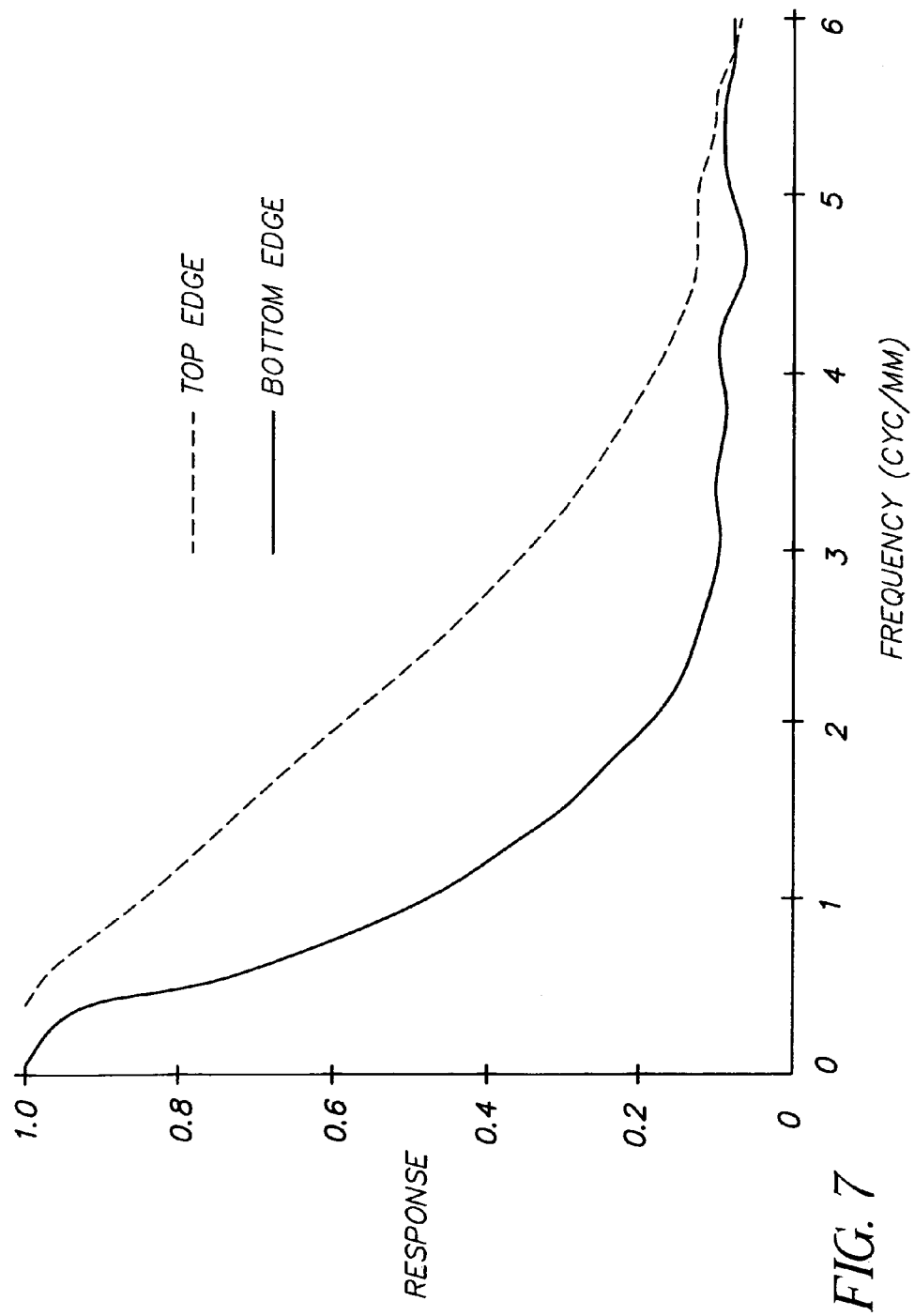
FIG. 7 is a plot of the MTF for the travel direction (down the page direction) of the printed image of FIG. 4.

FIG. 7 shows the MTF of the travel direction (also known as slow, or across the head, or down the page) response of the same thermal printer. The top edge (indicated by rectangle 57 in FIG. 4) going from light to dark is shown by a dashed line in FIG. 7. The bottom edge (indicated by rectangle 56 in FIG. 4) going from dark to light is shown by a solid line in FIG. 7. The curves are different with the dark to light edge showing more lag. Since light to dark edges occur as the resistors heat up and dark to light edges occur as the resistors cool down, the particular thermal printer has a much better MTF on rising edges (heating up) than it does for falling edges (cooling down).

Figure 8:
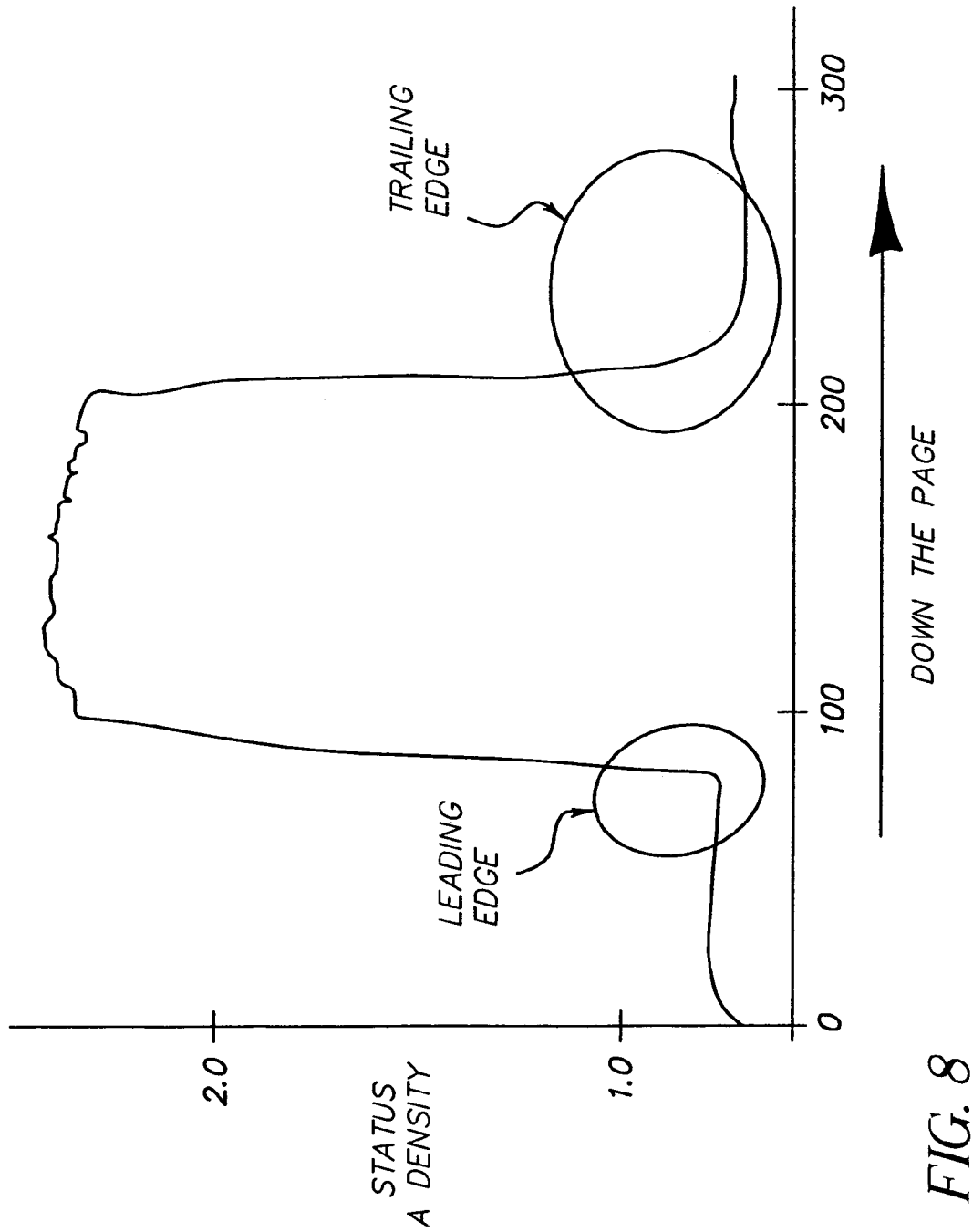
FIG. 8 is a diagram of a density trace through one of the edges of the dark square of the printed image of FIG. 4.

FIG. 8 shows a density trace through the dark square on a gray background in units of status A density, which is defined as a logarithmic reflectance measurement using a standardized narrow filter band set and is well known to those of skill in the art. The rising edge is quite sharp and the falling edge is blurry in agreement with the MTF traces in FIG. 7.

The MTF of the slow direction for rising or falling edges, is worse than the fast scan direction. The physical tracking of the donor-receiver past the thermal head causes a motion blur, or thermal smear. This thermal smear is the delay in time that it takes each individual resistor to heat up or cool down—by the time the resistor heats up, the donor/receiver has moved past the thermal head.

Figure 9A:
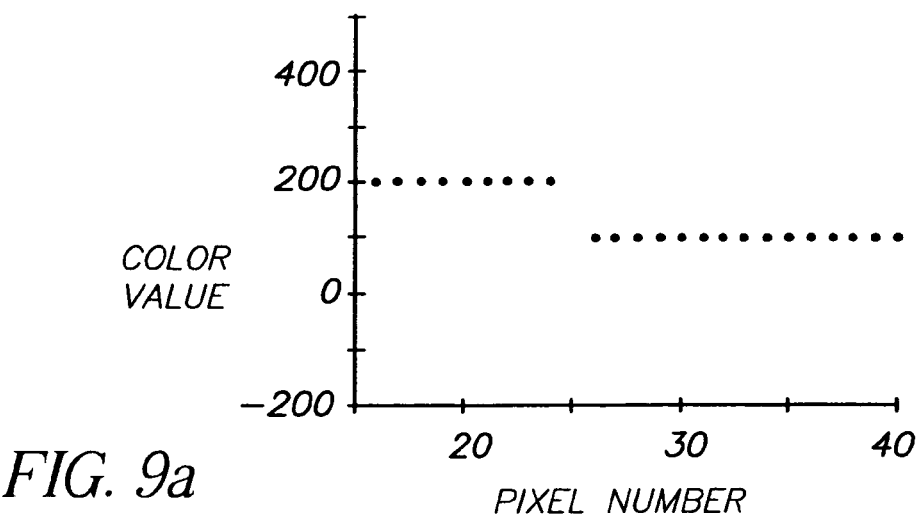
FIGS. 9a-9c are diagrams of a falling edge, a symmetric filter applied to the falling edge, and a non-symmetric filter applied to the falling edge, respectively. Horizontal axes are pixel number. Vertical axes are relative color value
Figure 9B:
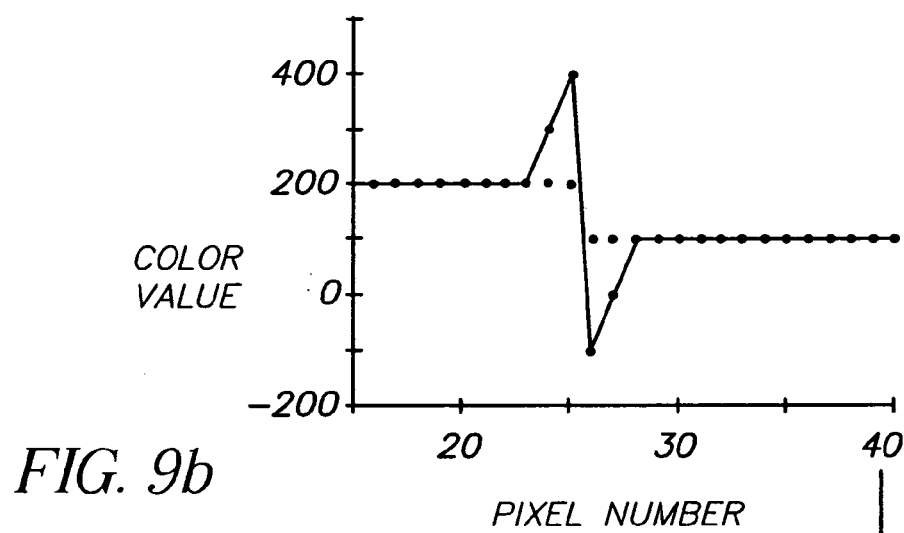
Figure 9C:
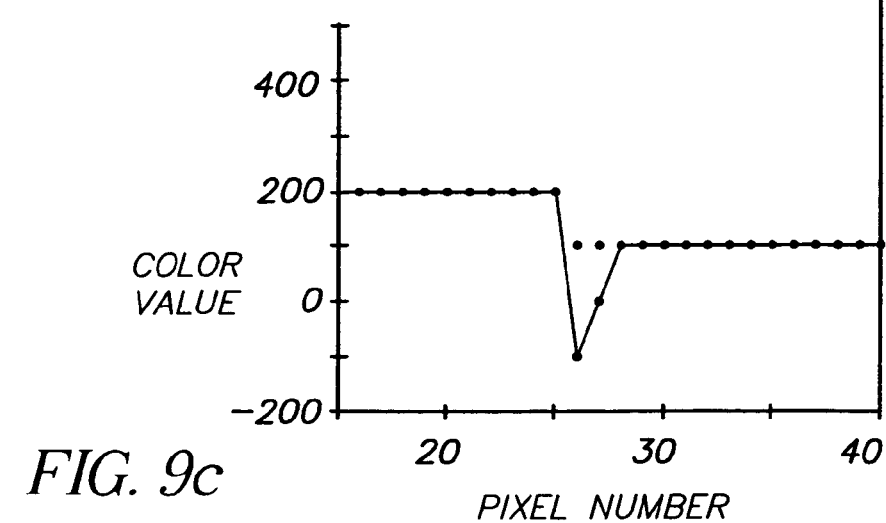

The smear compensating filter provides a down the page sharpness boost to compensate for the thermal smear. The smear compensating filtering is unidirectional, in that sharpening is only in the down the page direction. FIGS. 9a through 9c show the effect of a symmetric versus non-symmetric sharpening filter on a falling edge. Identical behavior can be shown for rising edges.

Figure 10A:
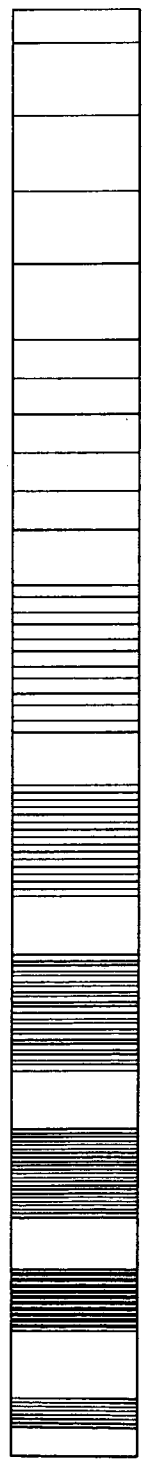
FIGS. 10a-10c are, respectively, diagrams of a frequency trace, the same trace after the application of a simple difference filter, and the same trace after application of the product of convolving the simple difference filter and a simple noise filter.
Figure 10B:
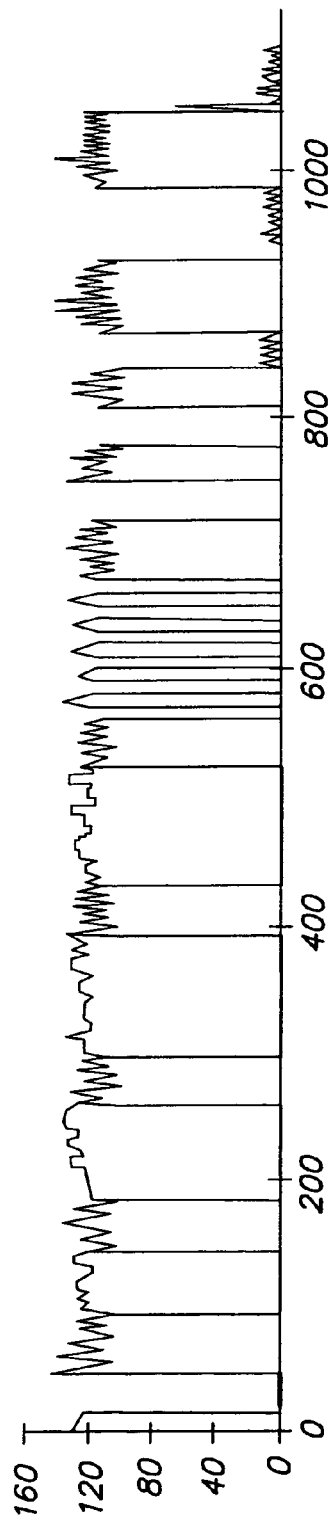
Figure 10C:
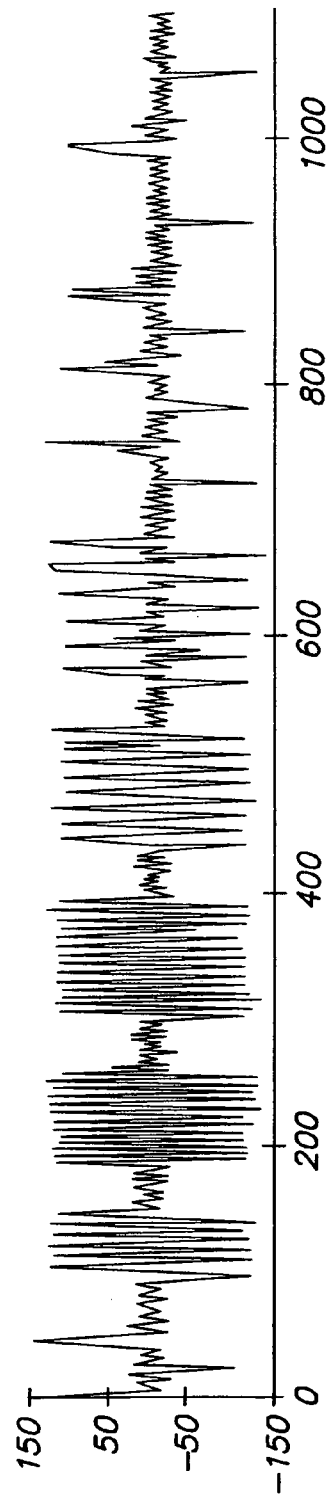

The smear compensating can also boost the falling edges more than the rising edges. This can be accomplished in conjunction with an edge detection filter. For example, FIG. 10a shows an image of different frequency bars (with noise added). FIG. 10b shows a trace through the center. FIG. 10c, then shows the result of applying a simple [1 0−1 0 0] difference filter. To minimize noise, the [1 0−1 0 0] filter can be pre-convolved with a blur filter or expanded to form boxcar filters such as [ 1 1 1 0−1−1−1 0 0 0 0] or truncated pyramid filters [1 2 3 0−3−2−1 0 0 0 0]. The resulting values in FIG. 10c can be used to drive a gain factor on an unsharp mask, or be used to selectively pick one of several filter kernels, which differ in extent of direct sharpening. To make the result perceptually uniform up and down the tone scale, the gain factor can also be dependent upon the center pixel pulse count. This can compensate for differences between rising and falling edges in highlights, shadows, and mid-tones.

Figure 11:
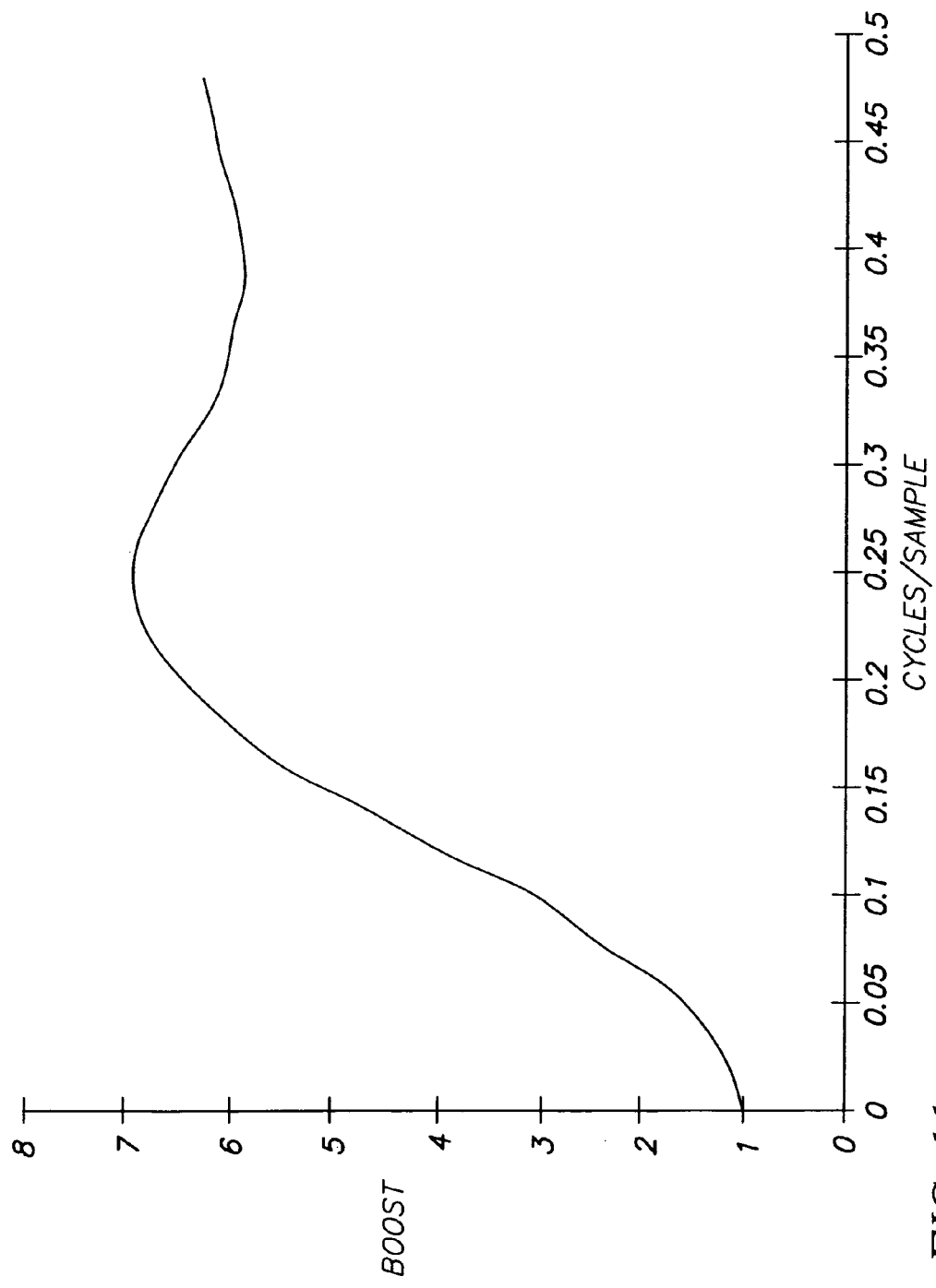
FIGS. 11-14 are diagrams of the filter response of the filters of Equations 1, 2, 3, and 8, respectively.

There are many ways to implement directional filters. For example, the 9×1 Finite Impulse Response (FIR) filter:

$$f1 = \begin{bmatrix} 0 \\ 0 \\ 0 \\ 0 \\ 3.046 \\ -0.957 \\ -0.809 \\ -0.347 \\ 0.067 \end{bmatrix} \quad \text{(Eq. 1)}$$

will do no sharpening up the page, but will sharpen down the page with the filter response in FIG. 11. Those skilled in the art will readily see that although Eq. 1, has 9 terms, zero terms are a multiply by 0 during a convolution operation and can be ignored. The convolution of Eq. 1 requires 5 multiplies and 4 additions. These multiplies can be replaced with pre-computed 1D LUTs, or these multiplies can be simplified to integer multiplies or bit shift operations.

If the thermal path only included a text smear filter, the down the page sharpness is good, but the up the page and left-right directions is too soft. This can be compensated for by use of a suitably sized separable horizontal and vertical boost filter or by a circular or elliptically symmetric sharpness filter. It is currently preferred, that the horizontal and vertical boost filter boosts the fast scan and slow scan directions with a baseline amount of sharpness. The down the page sharpness boost filter then adds an extra amount of sharpness only down the page.

Figure 12:
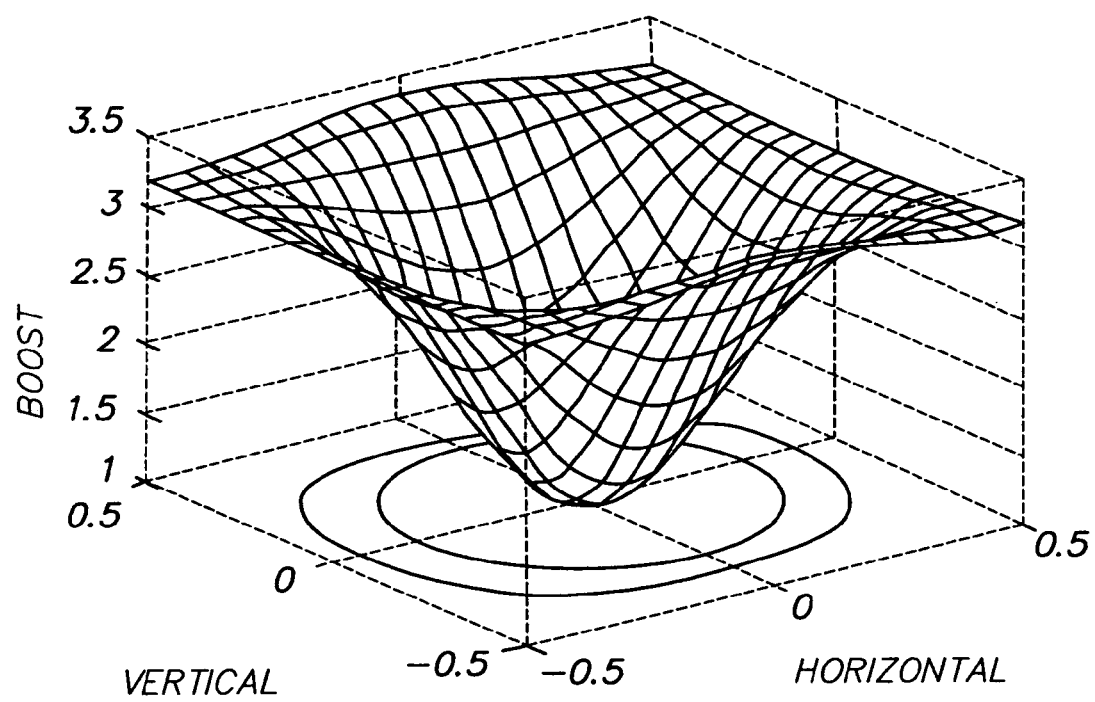

A specific example of the filter can be provided as now discussed. As a starting point, an elliptical symmetric FIR filter f2 has a 3.0 boost in the fast direction and a 3.5 boost in the slow direction. The frequency response of this filter in the horizontal (fast) and vertical (slow) direction is show in FIG. 12. Filter f2 is shown below:

$$f2 = \begin{bmatrix} -0.143 & -0.300 & -0.143 \\ -0.240 & 2.653 & -0.240 \\ -0.143 & -0.300 & -0.143 \end{bmatrix} \quad \text{(Eq. 2)}$$

Figure 13:
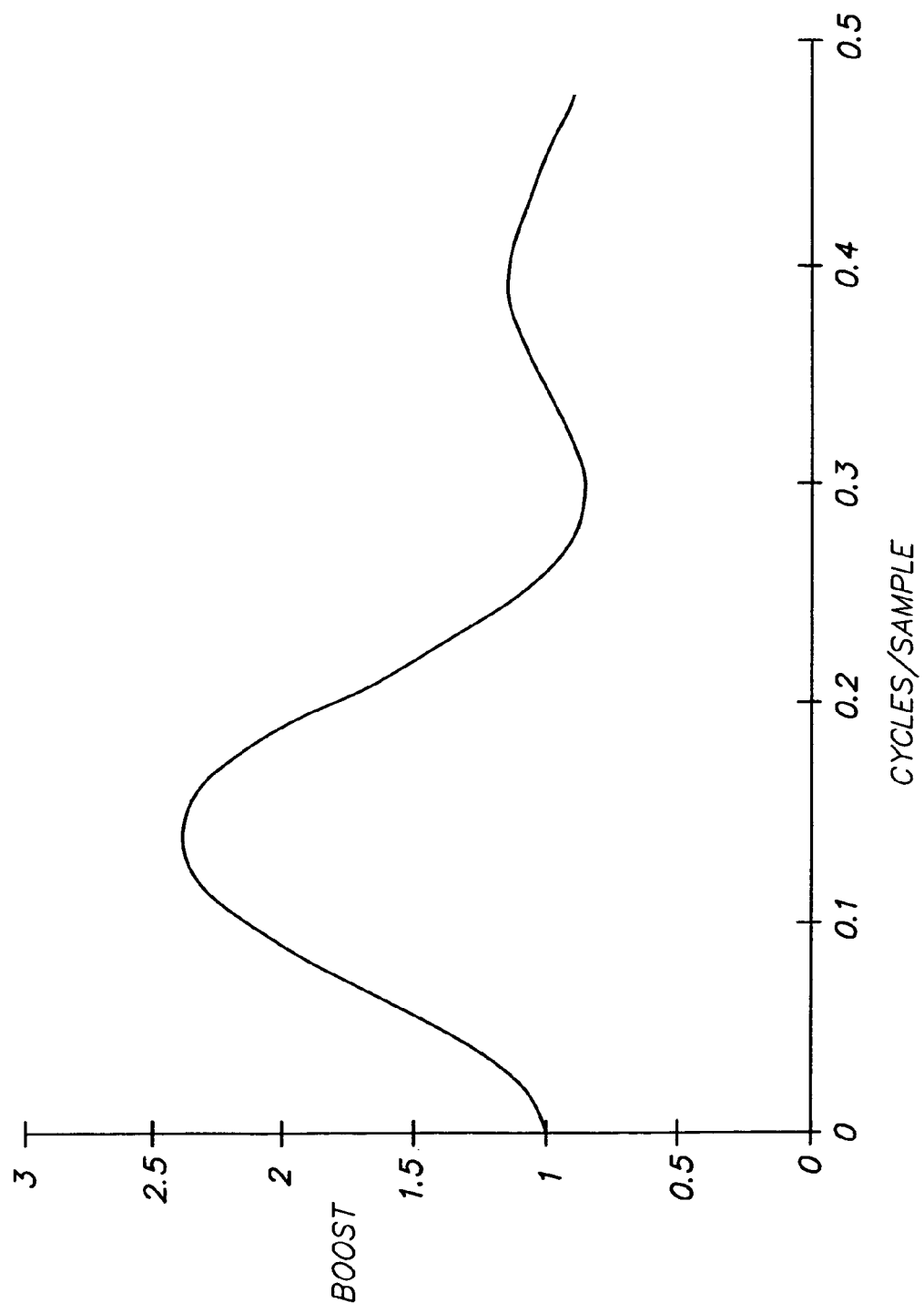

Applying filter f2 for the application of the horizontal and vertical sharpness boosts will give a baseline amount of sharpness to the thermal print. An example of a suitable limiting condition for this filtering is: if the filter boosted less aggressively in the fast or slow direction, prints would appear blurry and if the filter boosted more aggressively in the fast or slow direction, over sharpening artifacts would start to appear. Despite these conditions, additional sharpening without unacceptable results is still possible down the page. For example, referring to FIG. 5, a non-symmetric 9×1 FIR sharpness filter, f3 can be applied during the application of the down the page sharpness boost. The frequency response of such a down the page filter is shown in FIG. 13. Filter f3 is shown below:

$$f3 = \begin{bmatrix} 0 \\ 0 \\ 0 \\ 0 \\ 1.190 \\ 0.236 \\ -0.041 \\ -0.201 \\ -0.184 \end{bmatrix} \quad \text{(Eq. 3)}$$

Figure 16:
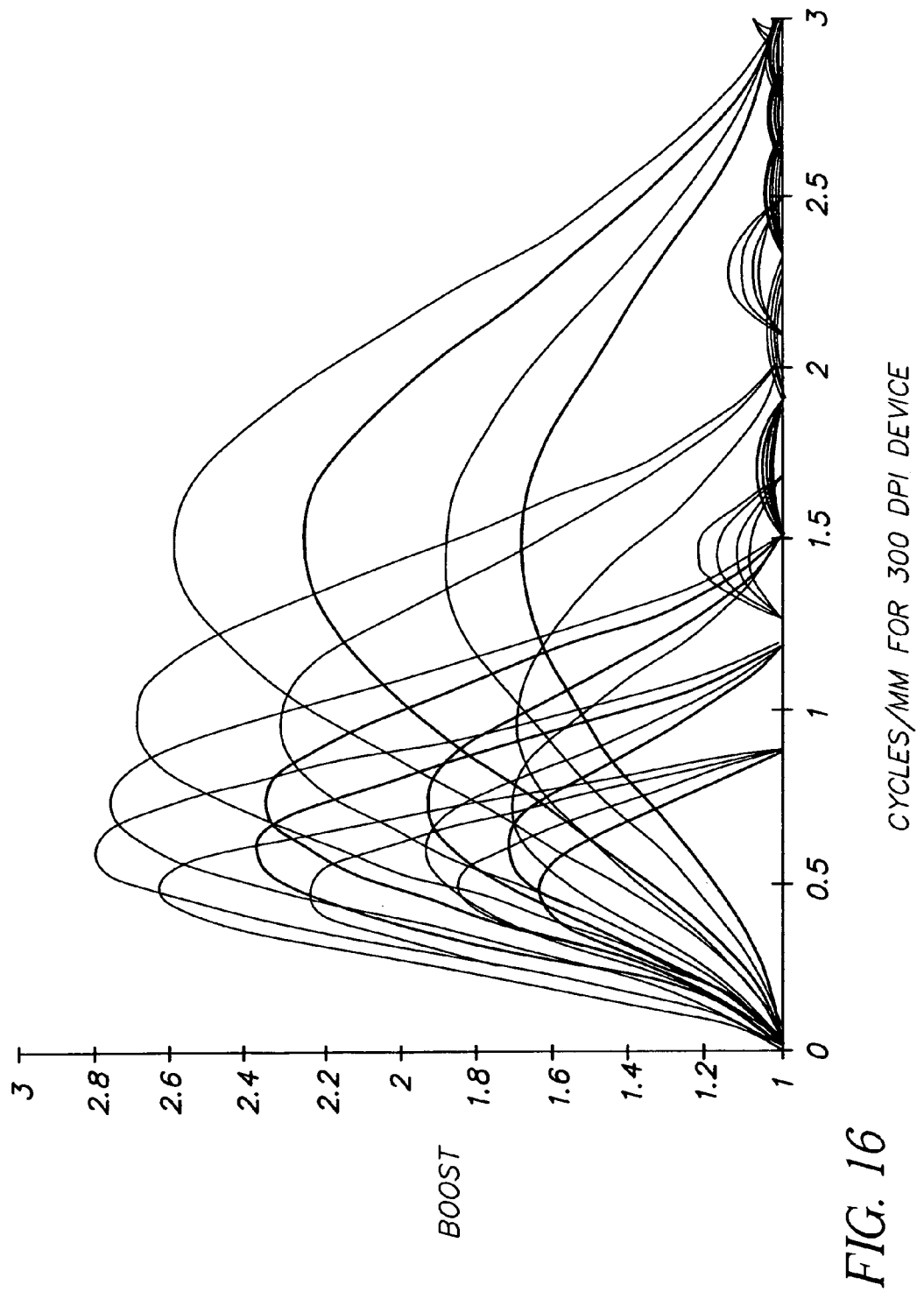
FIG. 16 is a plot of a family of smear compensating filters.

The set of filters shown in FIG. 16 was used as the down the page sharpness boost filter. Only the horizontal/vertical resolution bar target in FIG. 15 was printed. It is quite unlikely that any single filter from FIG. 16 will boost exactly what is necessary for all frequencies. However, using information from the set of printed images, custom filters can be designed heuristically to have just the right amount of boost at each frequency. This task involves deciding which prints have the proper boost at which frequency level, then doing a piecewise fit from the corresponding filter response for that frequency. For example, at 0.1 cycles/mm on the print, the preferred prints were coming from three of the aggressive low frequency filters; at 1.0 cycles/mm on the print, the preferred print was one of the mid-level aggressive filters. This process is done for each frequency location on the horizontal/vertical bar resolution target (0.1, 0.2, 0.6, 1.0, 1.5, 2.0, 3.0, 5.9 cycles/mm on the print), forming a scatter plot of preferred response boosts at each frequency on the image. A curve is fit to the scatter plot.

A family of filter responses with varying amounts of gain and or smoothing applied to that scatter plot can be tested with varying filter sizes. Larger filters fit the scatter plot quite close while smaller filters just approximate the overall shape. Any regression technique that finds the minimum of a function of several variables works well at optimizing a set of filter coefficients to a particular filter aim response.

Filter f2 can be preconvolved with filter f3 to generate an 11×3 filter. It is mathematically equivalent to apply f2 followed by f3, or just applying the pre-convolved single 11×3 non-symmetric FIR filter. The problem with the pre-convolved filter is that in the 11×3 filter, all the lower 7 rows are fully populated as follows:

$$f4 = f2 * f3 = \begin{bmatrix} 0 & 0 & 0 \\ 0 & 0 & 0 \\ 0 & 0 & 0 \\ 0 & 0 & 0 \\ -0.1705 & -0.3569 & -0.1705 \\ -0.3193 & 3.0855 & -0.3193 \\ -0.2213 & 0.2815 & -0.2213 \\ 0.0048 & -0.1185 & 0.0048 \\ 0.0804 & -0.4659 & 0.0804 \\ 0.0730 & -0.4279 & 0.0730 \\ 0.0264 & 0.0552 & 0.0264 \end{bmatrix} \quad \text{(Eq. 4)}$$

To reduce computational burdens, we would like more duplicate values, more quantized values, or more zeros in that filter. U.S. Pat. No. 4,780,761, to Daly et al., describes the characterization of the human visual system and applications for Q-table modification for JPEG compression techniques. It has been determined that higher frequency information is not as important as low frequency information, and that higher frequency information on diagonals is the toughest to perceive by humans. One solution is to forgo the circular symmetry. By extracting the horizontal and vertical response of filter f2 and ignoring the diagonal response, the computational burden can be reduced. The resulting image quality loss is negligible, since humans have a hard time seeing detail on diagonals and the diagonals are still being sharpened to some extent, just not the proper amounts.

Taking the vertical portion of f2, we get:

$$f2\_Vertical = \begin{bmatrix} -0.587 \\ 2.17 \\ -0.587 \end{bmatrix} \quad \text{(Eq. 5)}$$

Taking the horizontal portion of f2, we get:

$$f2\_Horizontal = [-0.527\ 2.05\ -0.527] \quad \text{(Eq. 6)}$$

Manually combining these two filters, we form:

$$f_{i}2\_H\_V\_Only = \begin{bmatrix} 0 & -0.587 & 0 \\ -0.527 & 3.23 & -0.527 \\ 0 & -0.587 & 0 \end{bmatrix} \quad \text{(Eq. 7)}$$

If we take our original f3 filter, and convolve with our filter f2_Vertical, we get:

$$f3*f2\_Vertical = \begin{bmatrix} 0 \\ 0 \\ 0 \\ 0 \\ -0.6984 \\ 2.4431 \\ -0.1623 \\ -0.1089 \\ -0.3034 \\ -0.2813 \\ 0.1080 \end{bmatrix} \quad \text{(Eq. 8)}$$

Figure 14:
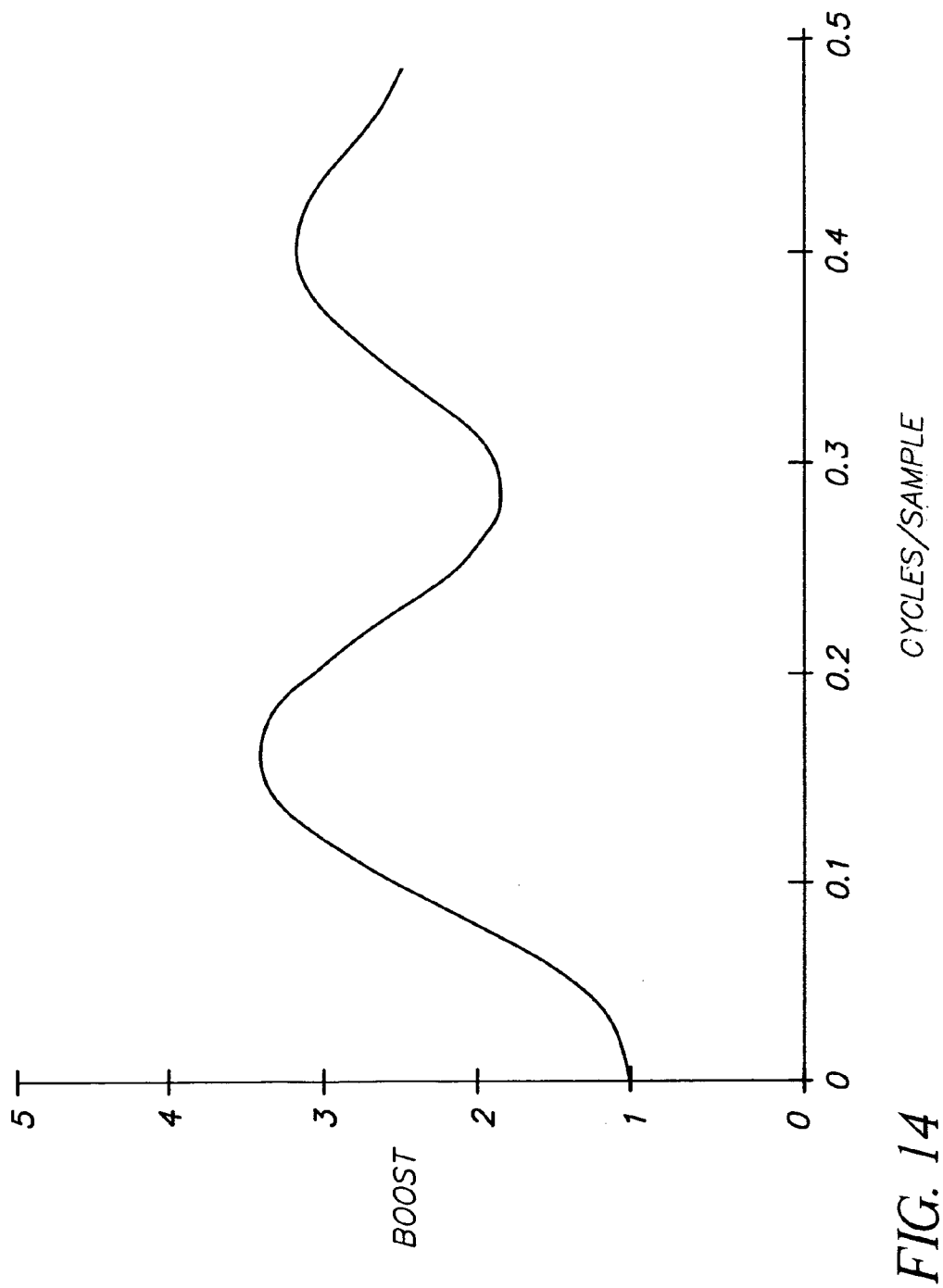

This combined response is shown in FIG. 14. The ringing in the mid to high frequencies, while undesirable, is tolerable because in the down the page direction, there is very little frequency content past 0.2 cycles/sample (see MTF plot in FIG. 2). Since the human eye is not particularly sensitive to those frequencies, it is hard to notice boosting by 2× or 3× at those frequencies. Of course, it is preferable not to have ringing, but it has been determined that human observers do not find such ringing noticeable.

If we now manually combine the horizontal and vertical directions of f3*f2_Vertical with f2_Horizontal, we get filter f5. This filter combines both application of horizontal and vertical sharpness boosts 40 as well as application of down the page sharpness boosts 80 in one convenient 11×3 FIR filter. Filter f5 is shown below:

$$f5 = \begin{bmatrix} 0 & 0 & 0 \\ 0 & 0 & 0 \\ 0 & 0 & 0 \\ 0 & 0 & 0 \\ 0 & -0.7012 & 0 \\ -0.5291 & 3.5115 & -0.5291 \\ 0 & -0.1629 & 0 \\ 0 & -0.1099 & 0 \\ 0 & -0.3053 & 0 \\ 0 & -0.2824 & 0 \\ 0 & 0.1084 & 0 \end{bmatrix} \quad \text{(Eq. 9)}$$

In total, we have 9 multiplies, but, since two of the coefficients or taps are identical, we can implement as 8 multiplies. These 8 multiplies can be implemented as 1D LUTs if desired. Since two of the coefficients, or taps, are identical, we can combine two of the multiplies into an add plus a multiply. All zero terms can be ignored.

To make things run a bit faster, we would like to remove all floating point multiplies. A common trick is to scale the entire kernel by some integer factor, and then round all the coefficients to the nearest integer. After applying the convolution kernel to each pixel, it is necessary to normalize the value, such that for flat DC fields there is no increase or decrease in signal. Since all coefficients are scaled by an integer, we will have to divide by the same integer value after the kernel is applied. If the kernel is scaled by a power of two, the divide operation can be by a power of two and be replaced by a bit shift operation.

For example, we can take filter f5, and scale it by 1024, giving us filter f6:

$$f6 = \begin{bmatrix} 0 & 0 & 0 \\ 0 & 0 & 0 \\ 0 & 0 & 0 \\ 0 & 0 & 0 \\ 0 & -719 & 0 \\ -524 & 3598 & -524 \\ 0 & -167 & 0 \\ 0 & -113 & 0 \\ 0 & -313 & 0 \\ 0 & -289 & 0 \\ 0 & 111 & 0 \end{bmatrix} \quad \text{(Eq. 10)}$$

After applying this filter, we need to divide by 1024, or do a bit shift by 10 bits. We can further optimize by rounding all multiples to be powers of two. This will then replace all multiples with bit-shifts reducing computational demands.

Filters of the form in Equation 10 are surely fast to implement, but, if we wanted to control the sharpness of diagonals, we could slowly start to add back the circular symmetry. Referring back to Equation 4, we could keep only the most significant diagonal terms creating Equation 11:

$$f11 = \begin{bmatrix} 0 & 0 & 0 \\ 0 & 0 & 0 \\ 0 & 0 & 0 \\ 0 & 0 & 0 \\ -0.1705 & -0.3569 & -0.1705 \\ -0.3193 & 3.4542 & -0.3193 \\ -0.2213 & 0.2815 & -0.2213 \\ 0 & -0.1185 & 0 \\ 0 & -0.4659 & 0 \\ 0 & -0.4279 & 0 \\ 0 & 0.0552 & 0 \end{bmatrix} \quad \text{(Eq. 11)}$$

Equation 11 could similarly be integerized for faster integration. A continuum of filters from Equation 4 to Equation 11 can be created. The more control required on diagonals, the more off terms to be kept from Equation 4.

In particular embodiments, one or more parameters of the smear compensating filtering can be modified either by a user, via a keyboard or other input controls, or automatically, without user intervention. Parameters that can be modified include one or more of: location of peak filter frequency, intensity of filtering at said peak frequency, and frequency width of said filtering. These parameters can be used to change filtering in a range from no aggressiveness to maximum aggressiveness in a linear fashion at each of a number of preselected peak frequency points and for each of a number of preselected width parameters. To reduce the computational burden, a family of filters varying in selected parameters, can be precomputed. The selection of which member of the family to use can be determined based on one or more of: tonality, local value of an edge indicator, metadata associated with the digital image, and type of image, such as an image having one or more faces, an image having one or more flesh areas, and an image having computer generated graphics or text.

Tonality is the overall appearance of the densities of the component areas of an image with respect to the effectiveness of the values in representing the subject of the image. With a monochromatic image tonality is an issue of expanding, contracting, and/or shifting the gray scale of the image. With color images, the same issues apply to tone scales of the individual color records. In addition, different parts of each tone scale, such as shadows, midtones, and highlights, can be tuned uniquely.

The presence of a rising or a falling edge in a local region can be used to determine modifications. The edge detection filter [1 0–1 0 0] requires no multiplies and is effective at determining the presence of a rising, falling, or flat region of the image. It also reports the strength of the rising or falling edge. After applying the [1 0–1 0 0] filter, we add 255 and divide by 2 to generate a positive edge indicator. The edge indicator value can be used as a scalar to an unsharp mask boost factor, or be used as an entry into a multidimensional grid of filters. Larger filters or non-linear filters can also be used with increased image quality, but slower execution time. For example, in a particular printer, leading edges or no edge detection would have small boosts while trailing edges would have large boosts.

Metadata is non-image information associated with an image. Metadata can be provided within a digital image file or separately. A wide variety of types of types of metadata are known to those of skill in the art. Of particular interest here is metadata that relates to image quality. For example, metadata indicating underexposure at capture, a high compression ratio from capture to storage, or a high ISO number at capture, are each associated with a greater degree of noise in the image. To minimize artifacts and mask the noise, less aggressive filters are preferred.

Image type looks to broad characteristics of an image and psychophysical factors related to acceptability of different degrees of sharpening. Images with faces or flesh look best if not overboosted. Images with lots of high frequency detail look best sharpened more. Computer generated graphics or imagery generally can tolerate more aggressive boosting. Types of image can be determined by a user and then input to the printing apparatus or can be automatically classified, without user intervention, using techniques known to those of skill in the art.

In the above discussion smear compensating filtering in the spatial domain is discussed. It will be apparent to one of skill in the art that filtering is not limited to the spatial domain. As an alternative, the smear correction can be applied in a frequency domain space. For example, a rolling one-dimensional Fast Fourier Transform of the last n-pixels can be performed for each resistor element. The frequency domain data is filtered, then converted back to the spatial domain, compensating for the smear. The magnitude is filtered via multiplication, the phase is shifted such that no phase shift occurs on return to the spatial domain. Similar techniques can be used with discrete cosine and wavelet transformations.

Smear is asymmetrical, but is not necessarily limited to a single direction. For example, an ink jet printer that has a smear in the down the page (travel) direction can also have an additional smear relating to reciprocating movement of the ink jet head in a secondary direction transverse to the travel direction. Filtering can be provided for smear in one or more secondary direction in the same manner as above-described for travel direction smear. An appropriate smear profile for each secondary direction can be prepared in the same manner as for travel direction smear. Filtering can be provided sequentially for each direction of smear based on the respective profile. In particular embodiments, it may be convenient to combine the travel direction filter and one or more secondary filters and to combine the respective profiles.

Smear can vary at different places on a image carrier. For example, an ink-jet printer that sweeps every other line left to right, then right to left, can have a down the page smear and two different secondary smears, with a left to right smear and a right to left smear alternating. Alternative profiles can be provided for the two different secondary smears.

The invention has been described in detail with particular reference to certain preferred embodiments thereof, but it will be understood that variations and modifications can be effected within the spirit and scope of the invention.

The invention claimed is:

1. A method for producing an output image from a digital image, said method comprising:
    receiving a digital image in an image output device having a predetermined number of profiles of smear in a travel direction, and one or more secondary profiles of smear in respective secondary directions different than said travel direction;
    generating a custom filter from said profiles of smear, wherein the filter is non-symmetrical in said travel direction and is a filter having a maximum increase in sharpening in the travel direction, and modifying said custom filter based on the secondary profiles of smear in the secondary directions, wherein the modified custom filter performs sharpening in the secondary directions;
    digitally filtering said digital image based on said filter;

moving an image carrier in said travel direction relative to an image generator; and during said moving, outputting said filtered image to the image generator and applying an image from the image generator to said image carrier to produce the output image.

2. The method of claim 1 wherein said custom filter is non-linear.

3. The method of claim 1 wherein said image carrier is a printable receiver and said image generator is a print head.

4. The method of claim 3 wherein said print head is a thermal print head having a plurality of individually actuable print elements, said elements being subject to lag in thermal heating and cooling, said smear being resultant to said lag.

5. The method of claim 1 wherein said image carrier is a transfer member.

6. The method of claim 1 wherein said image output device is an offset press.

7. The method of claim 2 wherein the non-linear filter responds to one or more of: tonality, local value of an edge indicator, metadata associated with the digital image, or type of image.

8. The method of claim 7 wherein said type of image includes: an image having one or more faces, an image having one or more flesh areas, or an image having computer generated graphics or text.

* * * * *